US011726242B2

(12) United States Patent
Behounek

(10) Patent No.: US 11,726,242 B2
(45) Date of Patent: Aug. 15, 2023

(54) ZONAL OPTICAL ELEMENTS

(71) Applicant: IQ STRUCTURES S.R.O., Husinec-Rez (CZ)

(72) Inventor: Tomas Behounek, Hluboka nad Vltavou (CZ)

(73) Assignee: IQS GROUP s.r.o., Husinec-Rez. (CZ)

( * ) Notice: Subject to any disclaimer, the term of this patent is extended or adjusted under 35 U.S.C. 154(b) by 0 days.

(21) Appl. No.: 15/129,119

(22) PCT Filed: Mar. 26, 2015

(86) PCT No.: PCT/EP2015/056554
§ 371 (c)(1),
(2) Date: Sep. 26, 2016

(87) PCT Pub. No.: WO2015/144823
PCT Pub. Date: Oct. 1, 2015

(65) Prior Publication Data
US 2018/0136377 A1    May 17, 2018

(30) Foreign Application Priority Data

Mar. 26, 2014 (GB) ..................... 1405462

(51) Int. Cl.
*G02B 27/44* (2006.01)
*G02B 5/18* (2006.01)
*G02B 27/09* (2006.01)
*G02B 27/42* (2006.01)
*G02B 19/00* (2006.01)
(Continued)

(52) U.S. Cl.
CPC ....... *G02B 5/1876* (2013.01); *G02B 19/0047* (2013.01); *G02B 27/0927* (2013.01); *G02B 27/0944* (2013.01); *G02B 27/425* (2013.01); *B42D 25/324* (2014.10); *B42D 25/328* (2014.10)

(58) Field of Classification Search
CPC ................ G02B 5/1876; G02B 5/1842; G02B 19/0047; G02B 27/0944; G02B 27/0927; G02B 27/425; G02B 27/0056; B42D 25/324; B42D 25/328
USPC .................................................. 359/19, 565
See application file for complete search history.

(56) References Cited

U.S. PATENT DOCUMENTS

| 4,909,626 A | 3/1990 | Purvis et al. |
| 5,069,813 A * | 12/1991 | Patel ........................ G02B 3/08 252/299.01 |
| 5,257,132 A | 10/1993 | Ceglio et al. |

(Continued)

FOREIGN PATENT DOCUMENTS

| EP | 2546070 A1 | 1/2013 |
| JP | 2006159667 A | 6/2006 |
| WO | 2006013215 | 2/2006 |

*Primary Examiner* — Audrey Y Chang
(74) *Attorney, Agent, or Firm* — Walters & Wasylyna LLC

(57) ABSTRACT

An optical element, e.g. based on a diffractive Fresnel lens, having suppressed or reduced chromatic aberration under non-monochromatic light and/or enhanced directional homogenisation in its angular irradiation characteristics, comprises a plurality of optical zones (10, 20), wherein each zone comprises at least one homogenising noise-introducing feature. In embodiments the at least one homogenising noise-introducing feature comprises one or more zonal displacement features, e.g. ripples (20', 20'') and/or one or more zonal modulation features, e.g. one or more patterning features (30).

16 Claims, 13 Drawing Sheets

(51) Int. Cl.
 *B42D 25/324* (2014.01)
 *B42D 25/328* (2014.01)

(56) References Cited

U.S. PATENT DOCUMENTS

| | | | | |
|---|---|---|---|---|
| 5,978,139 | A * | 11/1999 | Hatakoshi | B82Y 10/00 |
| | | | | 359/19 |
| 6,330,118 | B1 * | 12/2001 | Daschner | G02B 5/1876 |
| | | | | 359/565 |
| 8,117,955 | B2 * | 2/2012 | Roemerman | F41F 5/00 |
| | | | | 89/1.55 |
| 8,488,242 | B2 * | 7/2013 | Hill | G02B 5/1842 |
| | | | | 359/565 |
| 9,709,820 | B2 * | 7/2017 | Fujii | G02C 7/02 |
| 2013/0050473 | A1 | 2/2013 | Zalevsky et al. | |

* cited by examiner

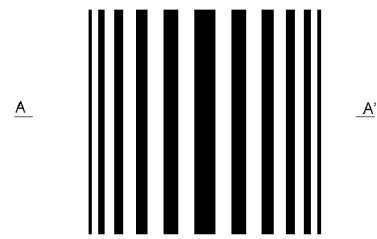
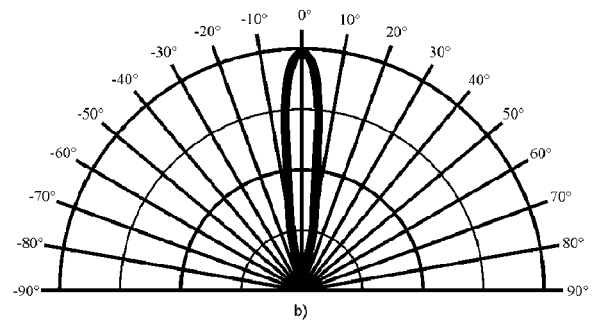
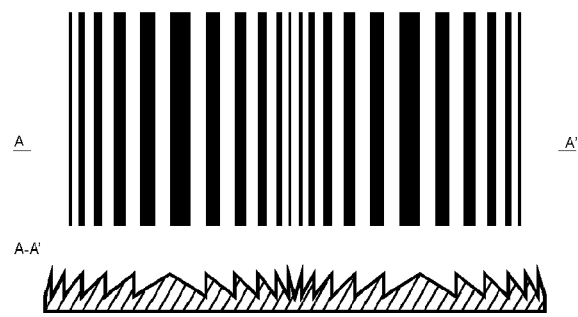
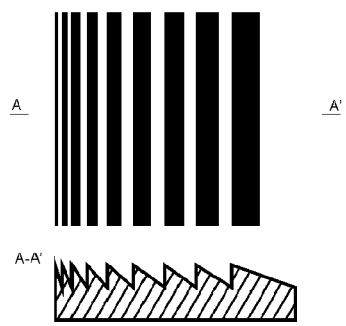
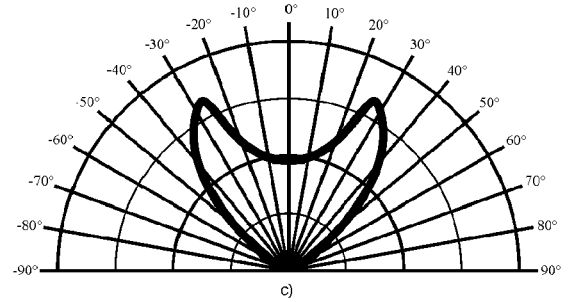
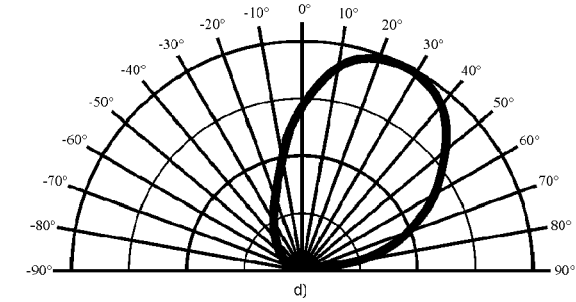
Fig. 9(b),(c),(d)

ZONAL OPTICAL ELEMENTS

TECHNICAL FIELD

This invention relates to zonal optical elements, especially though not exclusively diffractive zonal optical elements such as those based on or comprising Fresnel or other lenses or functional combinations including such lenses. More particularly the invention relates to zonal optical elements having enhanced homogeneity characteristics, especially enhanced chromatic homogeneity and/or enhanced directional homogeneity. The invention further relates to methods for the production of such optical elements.

BACKGROUND AND PRIOR ART

Fresnel lenses are generally known as an approximation of conventional lenses, but of much lower weight and volume in comparison therewith. As illustrated in FIG. 1 of the accompanying drawings, the basic principle of construction of a Fresnel lens is notionally based on slicing a conventional lens, as shown in FIG. 1(a), into thin plates perpendicular to the optical axis of the lens. Portions of the plates which do not carry a curved portion of the profile are notionally rejected, and all the remaining portions, called "zones", or "Fresnel zones", are notionally combined into one thin plate, as shown in FIG. 1(b). In the case of a standard lens, the zones form a set of concentric annuli. The resulting element is called a Fresnel lens, and it refracts light almost identically to the original lens. Therefore the Fresnel lens can focus, collimate, partially collimate, diverge, etc an incoming light beam in the same way as the original conventional lens.

A Fresnel lens may be of a reflective type, or a transmissive type, or a combined type, i.e. partially reflective and partially transmissive.

As shown in FIG. 2 of the accompanying drawings, if a lens is sliced into zones in such a way that the width of zones becomes comparable with the wavelength of light, then the Fresnel lens acts more as a diffractive, rather than a refractive, element, and in such a case it is usually called a diffractive Fresnel lens. In other words, a diffractive Fresnel lens can be constructed in the same way as a standard Fresnel lens. However, its optical function is driven more by the principle of diffraction rather than that of refraction, which can be understood as a special case of diffraction. Despite the diffraction approach, a diffractive Fresnel lens can also focus, collimate, partially collimate, diverge, etc an incoming light beam in the same way as a conventional lens. In the case of diffractive Fresnel lenses, these functions are a result of the planar geometry of the zones, i.e. their spacing, shape and other configurational characteristics, rather than a result of their relief profile.

FIGS. 3, 4 and 5 of the accompanying drawings show typical examples of diffractive Fresnel lens optical elements formed by zones 10, 20 of various types. For example: FIG. 3 shows in (a) an amplitude zone construction of the zonal optical element, (b) a transmission arrangement thereof, (c) a reflection arrangement thereof, and (d) a combined transmission and reflection arrangement thereof; FIG. 4 shows in (a) a relief type of phase zone construction of the zonal optical element, (b) a transmission arrangement thereof, and (c) a reflection arrangement thereof; and FIG. 5 shows a refractive index zone modulation construction of the zonal optical element.

By modifying the zone geometry, the diffractive Fresnel lens may become a more generalised diffractive lens, which may act, for example, as an off-axis lens or a multi-focal lens, or suchlike.

The zone structure of a zonal optical element based on diffraction and/or refraction principles, e.g. a diffractive Fresnel lens, can be overlaid with another diffractive structure, for example a diffractive diffuser. Such a lens can then combine focusing and scattering functions on the basis of the planar geometry of the included features. Such "hybrid" optical elements can also homogenise an incident light beam in its intensity and/or angular irradiation spectrum, and/or redistribute an incident beam into a specific illumination pattern. This is illustrated in FIG. 6 of the accompanying drawings, which shows various functions of optical elements of the nature of (a) collimation, (b) focusing, (c) divergence, (d) diffusion, and (e) general beam redistribution.

A diffractive optical element comprising original zones, e.g. Fresnel zones, and/or a more generalised diffractive structure may be designed for example by any of: (1) an approach as described above in relation to FIG. 1 by "slicing" a conventional lens into zones, (2) the use of grating equations, (3) Fourier transform algorithms, (4) random or pseudo-random noise generators, or (5) a combination of any two or more of (1) to (4). Examples of such known diffractive optical elements are disclosed for example in WO2006/013215 A1.

In other prior art, various lighting solutions comprising classical refractive optics (i.e. Fresnel lenses, prisms, diffusers, etc) and/or diffractive optics in the automotive industry (e.g. headlamps, interior lighting) and the general lighting industry can be found in US2008/068852A, US2003/081419A, US2010/150200A, US2011/038150A, US2013/318444A, and U.S. Pat. No. 6,352,359B, CN102767772A, CZ291014B and EP2156985A1.

A common feature of known zonal optical elements, e.g. diffractive Fresnel lenses, is chromatic aberration. A typical zonal optical element such as a diffractive Fresnel lens exhibits quite a significant chromatic aberration, and its focusing and/or imaging properties are strongly dependent on the wavelength of light interacting with the zonal structure of the element. This becomes a particular problem when a beam of white light interacting with the zonal optical element is required to create a desired or required illumination pattern. When the incoming white light reaches the diffracting and/or refracting zones, it is dispersed because the diffraction angle depends, inter alia, on the wavelength of the incident light. Hence each spectral component of the white light is diffracted in a different direction, with the result that a rainbow effect is created instead of the directed white light beam.

If a zonal optical element is required to interact with white light in such a way that the outgoing light is perceived as white, then the chromatic aberration needs to be suppressed or reduced. Various techniques have hitherto been proposed for this purpose:

One such technique for suppressing the chromatic aberration of a zonal optical element is the so-called "RGB method" or "multi-wavelength approach", as disclosed for example in WO2006/013215A1, US2002/191394A and US2003/209714A. In this method the zone structure is designed typically for three or more wavelengths. Groups of zones designed for each wavelength alternate within the entire zone pattern of the lens. Each wavelength of incoming white light diffracts into a different direction on a specific group of zones, and at the end all wavelengths propagate at mutually mixed directions. Therefore the resulting light appears to the observer as white.

Another technique for suppressing the chromatic aberration of a zonal optical element is the so-called "noise" method, as disclosed for example in WO2006/013215A1. In this method "noise" is added to the zone pattern. "Adding noise" means adding modulation to the zonal optical element surface and/or to its zone elements, as illustrated for example in FIG. 7 of the accompanying drawings, which shows examples of zonal optical element functions with implemented noise of the nature of (a) diffraction of an incoming beam into a fan of multiple directions at the optical element output, and (b) two distinct beams at the optical element input being blended at the optical element output.

The light at the output of such a zonal optical element that combines two or more zonal structures (according to the RGB method described above), in which each zonal structure is designed to redirect only one incoming monochromatic light beam, is not very flexible with regard to the spectral composition of the incoming light. As a result, for example, slightly different white light sources may not be tuned to a single specific zone design, and the rainbow effects of chromatic aberration can thus become visible, which is a problem.

On the other hand, using the noise implementation method can keep output light achromatic for a much wider range of spectrally different white light sources. However, the higher the degree of the implemented noise, the more scattering of the optical element occurs, and hence a rather diffusive optical element is created instead of an element directing the white light beam into predetermined directions. This is another problem.

If a zonal optical element is required to modify irradiation characteristics of a light source, for example to make irradiation at the output of the element more uniform within a specific angular range, then homogenising features need to be added to the zonal structure. The noise implementation method can in principle be used to keep the angular and/or intensity distribution of outgoing light more homogeneous. However, the higher the degree of the implemented noise, the more scattering of the optical element occurs, and hence a rather diffusive optical element is created instead of an element with an optimum required or desired angular and/or intensity homogeneity. This is yet another problem.

SUMMARY OF THE INVENTION

It is therefore a primary object of the present invention to ameliorate or at least partially solve or reduce the deleterious effects of the above shortcomings of known zonal optical elements, especially those based on or comprising diffractive Fresnel or other lenses, and to provide such zonal optical elements which have enhanced homogeneity characteristics, especially enhanced chromatic homogeneity, particularly suppressed or reduced chromatic aberration, and/or enhanced directional homogeneity, particularly improved homogeneity with respect to angular and/or intensity irradiation distribution characteristics.

Accordingly, the present invention seeks to provide a novel approach to introducing noise into the zone structure of a zonal optical element, such as that of a Fresnel or other lens or a functional combination including such a lens, especially a diffractive Fresnel or other lens or a functional combination including same, with a goal of enhancing homogeneity characteristics of its optical function. Such enhanced homogeneity characteristics may for example be manifested in suppressed or reduced chromatic aberration, especially where the light source is non-monochromatic. Additionally or alternatively, such enhanced homogeneity characteristics may be manifested in advantageously modified angular and/or intensity distribution characteristics of light incident on and/or passing through the zonal optical element, especially advantageously homogenised irradiation characteristics of outgoing light within a specific angular range.

In a first aspect of the present invention there is provided an optical element comprising a plurality of optical zones, wherein at least one or more of the zones comprises at least one noise-introducing feature.

Preferably the at least one noise-introducing feature is provided in or on or at least partially within the or at least a respective one of the said zone(s) itself/themselves.

In preferred embodiments of the preceding first aspect, the at least one or more of the zones may comprise at least one homogenising noise-introducing feature.

In particularly preferred embodiments of the preceding first aspect, the at least one or more of the zones may comprise one or more chromatic homogenising features and/or one or more directional homogenising features.

In especially preferred embodiments of the preceding first aspect, any of the said one or more chromatic homogenising features and/or one or more directional homogenising features may comprise one or more homogenising zonal modification features.

In many preferred embodiments of the preceding first aspect, any of the said one or more homogenising zonal modification features may be independently selected from one or more zonal displacement features and/or one or more zonal modulation features.

In an alternative first aspect of the invention there is provided an optical element comprising a plurality of optical zones, wherein at least one or more of the zones comprises, or at least one or more of the zones each comprises, at least one noise-introducing zonal displacement feature and/or at least one noise-introducing zonal modulation feature.

In embodiments of either of the above first aspects of the invention, at least one of the said zones may comprise any of the said one or more homogenising features, e.g. one or more zonal displacement features and/or one or more zonal modulation features. In many embodiments a plurality of the said zones may each comprise one or more features independently selected from any one or more of the said homogenising features, e.g. one or more zonal displacement features and/or one or more zonal modulation features. In some embodiments a majority of, or possibly even most of or substantially all of, the said zones may each comprise one or more features independently selected from any one or more of the said homogenising features, e.g. one or more zonal displacement features and/or one or more zonal modulation features. Thus, in the various embodiments, when any one said preferably chromatic or directional homogenising feature is present in any given zone, it may be independently selected from any one species or example of any of the various said zonal displacement features and/or zonal modulation features.

In a first species of embodiments of the invention according to the first aspect the zonal optical element may comprise at least one zonal displacement feature.

By "zonal displacement feature" is preferably meant a constructional and/or configurational and/or property (especially optical property) feature of at least a portion or region of the respective zone in which one or more components or elements of the zone is/are displaced relative to the position and/or configuration and/or orientation of corresponding zonal component(s) or element(s) in unmodified (i.e. undisplaced) zone(s) of analogous known zonal optical elements.

In some forms of such first species embodiments, at least one edge or boundary of at least one or more of the zones may have a deviant shape or configuration, that is to say it may have a shape/configuration which deviates from the original, undisplaced, shape/configuration of the respective zone edge or boundary. "Deviant shape/configuration" may alternatively mean that the shape/configuration of the respective zone edge or boundary is other than a straight line or an arc having a continuously and/or gently curved (especially continuously and/or smoothly and/or gently curved in one direction or plane only) form, shape or configuration. By "deviant shape/configuration" may alternatively or additionally be meant that the respective zone edge or boundary is convoluted, distorted, periodically changing (e.g. sinuous) or irregular in form, shape or configuration. Optionally both edges or boundaries of the or the respective zone may have a deviant shape or configuration, as defined above. The said deviant shape(s) or configuration(s) is/are preferably in the sense of being so deviant in at least a plane being or contained within the general plane of the optical element itself.

In some such first species embodiments, at least one or more of the zones may be rippled, or the respective zone may have one or more edges or boundaries which is/are rippled in shape. The shape or form of ripples in different zones of a plurality of rippled zones may the same or different from one such zone to another. The rippled shape may preferably be in the sense of being rippled at least in the general plane of the optical element. Such ripples may be generated or arranged randomly, quasi-randomly or deterministically, and may have various and/or varying degrees of modulation depth, i.e. ripple amplitude, and/or ripple periodicity or wavelength.

In some such first species embodiments, the width of at least one or more of the zones may vary along its length. Alternatively or additionally the orientation or directional axis of the or each respective one of at least one or more of the zones (i.e. a longitudinal axis lying generally centrally of the respective zone) may vary along its length.

The configuration of the one or more edges or boundaries of a respective zone may be the same or different or opposite or complementary to each other.

A displacement function which defines the configuration, relative to the or each respective undisplaced zone, of either or both edges or boundaries of a respective zone may be substantially constant along at least a portion of the length of the respective zone. Optionally the function may be substantially constant along substantially the whole length of the respective zone.

Alternatively, a displacement function which defines the configuration, relative to the or each respective undisplaced zone, of either or both edges or boundaries of a respective zone may vary along at least a portion of the length of the respective zone. Optionally the function may vary along substantially the whole length of the respective zone.

In the case of a displacement function which defines the zonal displacement feature in terms of its construction and/or configuration and/or one or more of its properties may in some embodiments define an edge or boundary of the respective zone itself, or in other embodiments it may define a portion or region of the zone having one or more properties, especially optical properties, which differ(s), especially significantly or substantially, from that/those properties of the remainder of the said zone. Such variable properties may be selected for example from any of optical reflectivity, optical absorptivity, refractive index, and/or relief height or depth. Any of such properties may vary substantially suddenly or binarily in defining an edge or boundary of a respective zone, or alternatively it/they may vary gradually or continuously in defining an edge or boundary region of the respective zone.

In a second species of embodiments of the invention according to the first aspect the zonal optical element may comprise at least one zonal modulation feature.

By "zonal modulation feature" is preferably meant a constructional and/or configurational and/or material and/or one or more property (especially optical property) features of at least a portion or region of the respective zone in which one or more components or elements of the zone is/are modulated or patterned in its/their construction and/or configuration and/or material and/or one or more properties (especially optical properties) in comparison with corresponding zonal component(s) or element(s) in unmodified (i.e. unmodulated) zone(s) of analogous known zonal optical elements.

By "material" modulation or patterning is meant a change in the material of or form which the relevant portion or region of the respective zone is formed or comprised. Such "material" modulation or patterning may be introduced or applied for instance by appropriate selection of material(s) (such as appropriately selected metal(s) or high refractive index material(s)), e.g. within the zonal structure itself or as a coating or layer applied or formed therein or thereon, which constitute(s) or form(s) the modulation or patterning feature(s).

By "property" modulation or patterning is meant a change in one or more properties, especially optical properties, of the relevant portion or region of the respective zone. Examples of such "property" modulation or patterning may include any one or more of: (1) modulation or forming of a patterned region or portion by virtue of modified optical reflectivity of the zone(s) material, e.g. relatively more or less reflective zone areas, (2) modulation or forming of a patterned region or portion by virtue of modified optical absorbance of the zone(s) material, e.g. relatively more or less absorptive zone areas, (3) modulation or forming of a patterned region or portion by virtue of a local change in the refractive index within a given zone or zones, and/or (4) modulation or forming of a patterned region or portion by virtue of a varying relief height or depth.

It is to be understood that the modulation or patterning may not necessarily have to have a discrete, i.e. binary, form, e.g. full zone portions/areas versus missing zone portions/areas, but instead it may take the form of a continuous and/or a stepped change of zone material and/or properties, whether in the vicinity of the required portion(s) or area(s) of the respective zone or even further afield within each zone generally, e.g. continuously varying and/or stepwise varying zone material and/or properties such as the above variable material or reflectivity, absorptivity, refractive index, and/or relief height/depth, etc.

In preferred forms of such second species embodiments, the said one or more zones may comprise, or may each comprise, or may have applied thereto, one or more regions, portions, sites or patches having one or more structural and/or configurational and/or material and/or property discontinuities or interruptions. Such one or more discontinuity- or interruption-introducing regions, portions, sites or patches may be provided, located or applied along at least a portion of the length or longitudinal direction of the respective zone and/or across at least a portion of (or optionally over substantially the whole of or even across a region, area or distance greater than) its width. Such one or more discontinuity-or interruption-introducing regions, portions, sites or patches may be provided, located or applied on substantially a single given zone, or discretely on each of a plurality of respective zones, or alternatively it/they may be provided, located or applied on or across two or more, e.g. two or more neighbouring or adjacent, zones jointly or collectively.

Such one or more zonal modulation features may be generated, arranged or distributed randomly, quasi-randomly or deterministically along the respective zone(s).

In some such second species embodiments, at least one or more of the zones may comprise at least one patterning feature which includes at least one feature selected from encoded data, one or more graphical images, alpha-numerical data or indicia, or one or more holographic features. Such patterning features may for example constitute a security feature, in addition to their primary function as a noise-introducing homogenising feature, e.g. for suppressing or reducing chromatic aberration and/or homogenising output irradiation characteristics.

Further preferred features and practical examples of the above-defined zonal displacement and/or zonal modulation species of zonal modification features useful in various embodiments of the invention will be given further hereinbelow in the context of specifically described preferred exemplary embodiments in conjunction with the remaining accompanying drawings.

In many embodiments of the first aspect of the present invention the optical element may comprise a Fresnel lens, especially a diffractive Fresnel lens, or a functional combination including a Fresnel, or a diffractive Fresnel, lens.

In some embodiments of the invention the optical element may further comprise, in addition to a main optical structure element as defined and discussed above which includes the characteristic at least one noise-introducing feature, at least one auxiliary functional element, that is to say at least one auxiliary element having at least one auxiliary optical function. Such an auxiliary functional element may for example comprise an optical diffuser or homogenising element, e.g. a diffuser plate or other type of element with a diffusing or homogenising function. Such an auxiliary functional element may optionally serve as a carrier for the main optical structure of, or the remainder of, the optical element. Alternatively at least one discrete carrier or carrier layer may be provided for carrying the main optical structure, which carrier or carrier layer may optionally be sandwiched, together with the main optical structure, with any discrete auxiliary functional element in any suitable or appropriate combination or order to form the complete finished optical element.

In such embodiments the one or more auxiliary functional element(s), and/or one or more carriers or carrier layers, may be applied to the remainder of, or the main structure of, the optical element by any suitable means, including for example any suitable known method of mounting, lamination, direct pressing, adhesion (using any suitable known adhesive or other bonding technique), printing, or even unitary moulding therewith.

In some practical embodiments of the invention the optical element may optionally further comprise, or be provided with, at least one cover layer. One or a plurality of cover layers may be employed. The or at least one such cover layer may be a protective cover layer, i.e. a layer which is constructed and/or configured to protect the main structure of, or the one or more layers of, the optical element therebeneath. The or each cover layer may or may not itself be optically active.

As with the attachment of the optional one or more auxiliary functional element(s) and/or carrier(s), in embodiments comprising at least one cover layer, the one or more cover layer(s) may be applied to the remainder of, or the main structure of, the optical element by any suitable means, including for example any suitable known method of mounting, lamination, direct pressing, adhesion (using any suitable known adhesive or other bonding technique), printing, or even unitary moulding therewith.

In a second aspect of the present invention there is provided a method of forming an optical element having a zonal structure comprising a plurality of optical zones, e.g. a Fresnel lens, especially a diffractive Fresnel lens, or a functional combination including such a lens, the method comprising forming said optical zones so as to include at least one noise-introducing feature, preferably at least one homogenising noise feature, in at least one or more of said zones.

In preferred embodiments of the preceding second aspect, the method may comprise forming said optical zones so as to include at least one chromatic homogenising feature and/or at least one directional homogenising feature in at least one or more of said zones.

In especially preferred embodiments of the preceding second aspect, the method may comprise forming said optical zones so as to include at least one zonal displacement and/or at least one zonal modulation feature in at least one or more of said zones. Such zonal displacement and/or zonal modulation feature(s) may in various embodiments be any of those respective features as defined above in the context of the first aspects of the invention.

In a third aspect of the present invention there is provided a method of adding noise to an optical element having a zonal structure comprising a plurality of optical zones, e.g. a Fresnel lens, especially a diffractive Fresnel lens, or a functional combination including such a lens, the method comprising forming said optical zones so as to include at least one noise-introducing feature, preferably at least one homogenising noise feature, in at least one or more of said zones.

In preferred embodiments of the preceding third aspect, the method may comprise forming said optical zones so as to include at least one chromatic homogenising feature and/or at least one directional homogenising feature in at least one or more of said zones.

In especially preferred embodiments of the preceding third aspect, the method may comprise forming said optical zones so as to include at least one zonal displacement and/or at least one zonal modulation feature in at least one or more of said zones. Such zonal displacement and/or zonal modulation feature(s) may in various embodiments be any of those respective features as defined above in the context of the first aspects of the invention.

In a fourth aspect of the present invention there is provided a method of homogenising light, e.g. non-monochromatic light, passing through and/or reflected from an optical element having a zonal structure, e.g. a Fresnel lens, especially a diffractive Fresnel lens, or a functional combination including such a lens, the method comprising forming said optical zones of the optical element so as to include at least one chromatic homogenising feature and/or at least one directional homogenising feature in at least one or more of said zones, and passing the said light through and/or reflecting the said light from the said optical element. The optical element may be an optical element according to any of the first aspects of the invention or any embodiment thereof.

In especially preferred embodiments of the preceding fourth aspect, the method may comprise forming said optical zones so as to include at least one zonal displacement and/or at least one zonal modulation feature in at least one or more of said zones. Such zonal displacement and/or zonal modulation feature(s) may in various embodiments be any of those respective features as defined above in the context of the first aspects of the invention.

In a fifth aspect of the present invention there is provided a method of suppressing or reducing chromatic aberration in the passage of non-monochromatic light through and/or reflected from an optical element having a zonal structure comprising a plurality of optical zones, e.g. a Fresnel lens, especially a diffractive Fresnel lens, or a functional combination including such a lens, the method comprising forming said optical zones of the optical element so as to include at least one chromatic homogenising noise-introducing feature in at least one or more of said zones, and passing the said non-monochromatic light through and/or reflecting the said non-monochromatic light from the said optical element. The optical element may be an optical element according to any of the first aspects of the invention or any embodiment thereof.

In preferred embodiments of the preceding fifth aspect, the method may therefore comprise forming said optical zones of the optical element so as to include at least one zonal displacement and/or at least one zonal modulation feature in at least one or more of said zones. Such zonal displacement and/or zonal modulation feature(s) may in various embodiments be any of those respective features as defined above in the context of the first aspects of the invention.

In a sixth aspect of the present invention there is provided a method of modifying the angular and/or intensity characteristics of light, e.g. non-monochromatic light, passing through and/or reflected from an optical element, e.g. a diffusive-type optical element, having a zonal structure, e.g. a Fresnel lens, especially a diffractive Fresnel lens, or a functional combination including such a lens, the method comprising forming said optical zones of the optical element so as to include at least one directional homogenising noise-introducing feature in at least one or more of said zones, and passing the said light through and/or reflecting the said light from the said optical element. The optical element may be an optical element according to any of the first aspects of the invention or any embodiment thereof.

In preferred embodiments of the preceding sixth aspect, the method may therefore comprise forming said optical zones of the optical element so as to include at least one zonal displacement and/or at least one zonal modulation feature in at least one or more of said zones. Such zonal displacement and/or zonal modulation feature(s) may in various embodiments be any of those respective features as defined above in the context of the first aspects of the invention.

In a seventh aspect of the present invention there is provided a method of focusing or imaging light using an optical element according to any of the first aspects of the invention or any embodiment thereof.

In preferred embodiments of the preceding seventh aspect, the method may comprise focusing or imaging by passing light, e.g. non-monochromatic light, through and/or reflecting light, e.g. non-monochromatic light, from the said optical element, which may be an optical element according to any of the first aspects of the invention or any embodiment thereof.

In embodiments of the invention in any of its various aspects, the zonal optical element may be of any general known type. The basic underlying zonal structure of the optical element, without or before application of the special one or more noise-introducing, preferably chromatic and/or directional homogenising, more preferably zonal displacement and/or zonal modulation, features which characterise embodiments of the present invention, may be designed and/or constructed by any suitable known technique. Suitable examples of such techniques may include those disclosed in any of the following references, the contents of which are incorporated herein by reference: [1] Born, M. and Wolf, E., Principles of Optics, ($7^{th}$ ed.), Cambridge University Press, 1999; [2] Hariharan, P., Optical Holography, Cambridge University Press, 1996; [3] Webb, G. W., Minin, I. V. and Minin, O. V., "Variable Reference Phase in Diffractive Antennas", *IEEE Antennas and Propagation Magazine*, vol. 53, no. 2, April 2011, pp. 77-94; [4] http://en.wikipedia.org/wiki/Zone_plate#Relation_to_a_Fresnel_lens.

In some embodiments of the invention in any of its various aspects, the at least one zonal modification feature (i.e. preferably chromatic and/or directional homogenising feature) formed or provided in the or each respective zone of the optical element may advantageously be selected from one or more zonal displacement features and/or one or more zonal modulation features.

In one exemplary preferred form, the at least one zonal modification feature may comprise at least one zonal displacement feature, which may for instance be constituted by the respective zone or zones independently having one or both of its/their edges or boundaries rippled, convoluted, distorted, periodically changing (e.g. sinuous), or its/their width varying along the zone's/zones' length direction. The width(s) of the respective zone or zones and/or its/their distribution and shape(s) may preferably be designed such that it/they meet(s) the requirements for the redistribution of incoming light at the output of the zonal optical element.

Practical examples of suitable zonal displacement features will be given further hereinbelow in the context of specifically described preferred exemplary embodiments in conjunction with the accompanying drawings.

In another exemplary preferred form, the at least one zonal modification feature may comprise at least one zonal modulation feature, which may for instance be constituted by the respective zone or zones having one or more structural and/or configurational and/or material and/or property discontinuities or interruptions formed therein or thereon. Such one or more structural, configurational, material or property discontinuities or interruptions, which may be provided, located or applied along at least a portion of the length or longitudinal direction of the respective zone and/or across at least a portion of its width, may comprise at least one patterning feature.

Practical examples of suitable patterning features will be given further hereinbelow in the context of specifically described preferred exemplary embodiments in conjunction with the accompanying drawings.

Preferred embodiments of the various method aspects of the invention will be readily understood as corresponding to the various respective preferred embodiments of the other aspects of the invention as defined above.

Moreover, practical embodiments and examples of methods of forming zonal optical elements in accordance with the invention will be given in and be apparent from the detailed description of preferred embodiments, taken in conjunction with the accompanying drawings, as set out hereinbelow.

In a further, eighth, aspect of the present invention there is provided an optical system comprising at least one optical element according to any of the first aspects of the invention or any embodiment thereof together with at least one light source. In embodiments of such an optical system any suitable or desired number of, e.g. one or a plurality of, optical elements may be employed. Likewise, any suitable or desired number of light sources, e.g. one or a plurality thereof, may be employed. Examples of suitable light sources may include one or more LED's, bulbs or other known light-emitting devices.

Within the scope of this specification it is expressly envisaged that the various aspects, embodiments, examples and alternatives, and in particular the individual features thereof, set out in the preceding paragraphs, in the claims and/or in the following description and drawings, may be taken independently or in any combination. For example, features described in connection with one embodiment are applicable to all embodiments, unless expressly stated otherwise or such features are incompatible.

BRIEF DESCRIPTION OF THE DRAWINGS

Embodiments of the present invention in its various aspects will now be described in detail, by way of example only, with reference to the accompanying drawings, in which.

DETAILED DESCRIPTION OF EMBODIMENTS

Figure 1:
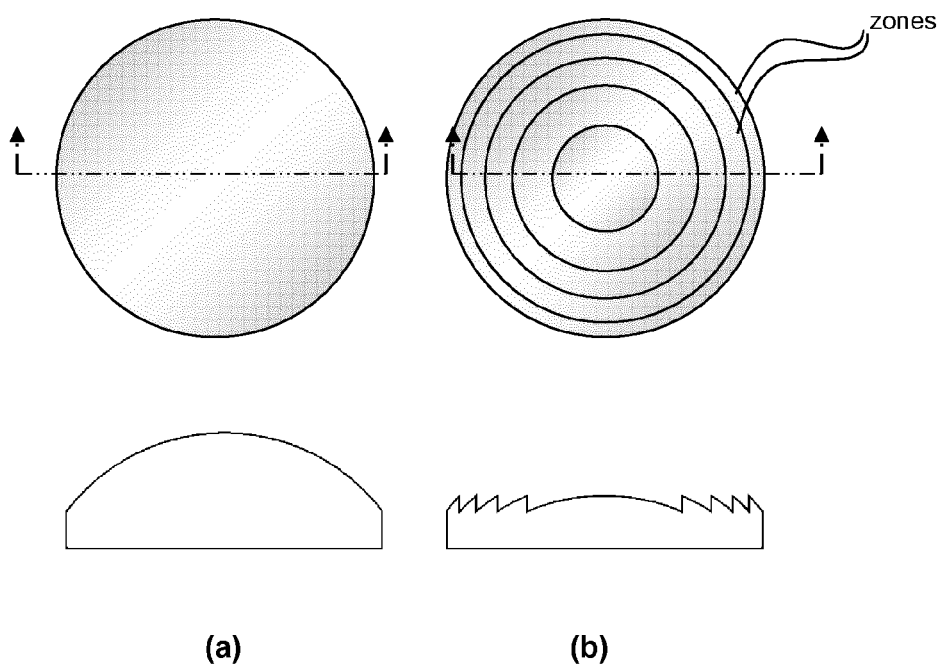
FIGS. 1(*a*) and (*b*), which have already been referred to, are top and cross-sectional views of, respectively, a conventional lens and an equivalent Fresnel lens.
Figure 2:
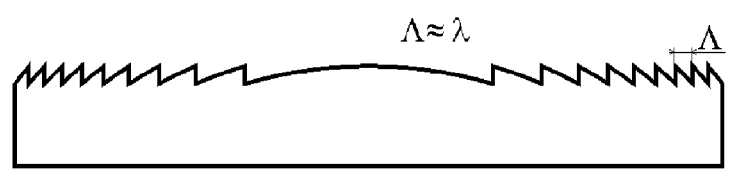
FIG. 2, which has already been referred to, is a cross-sectional view of a diffractive Fresnel lens.
Figure 3:
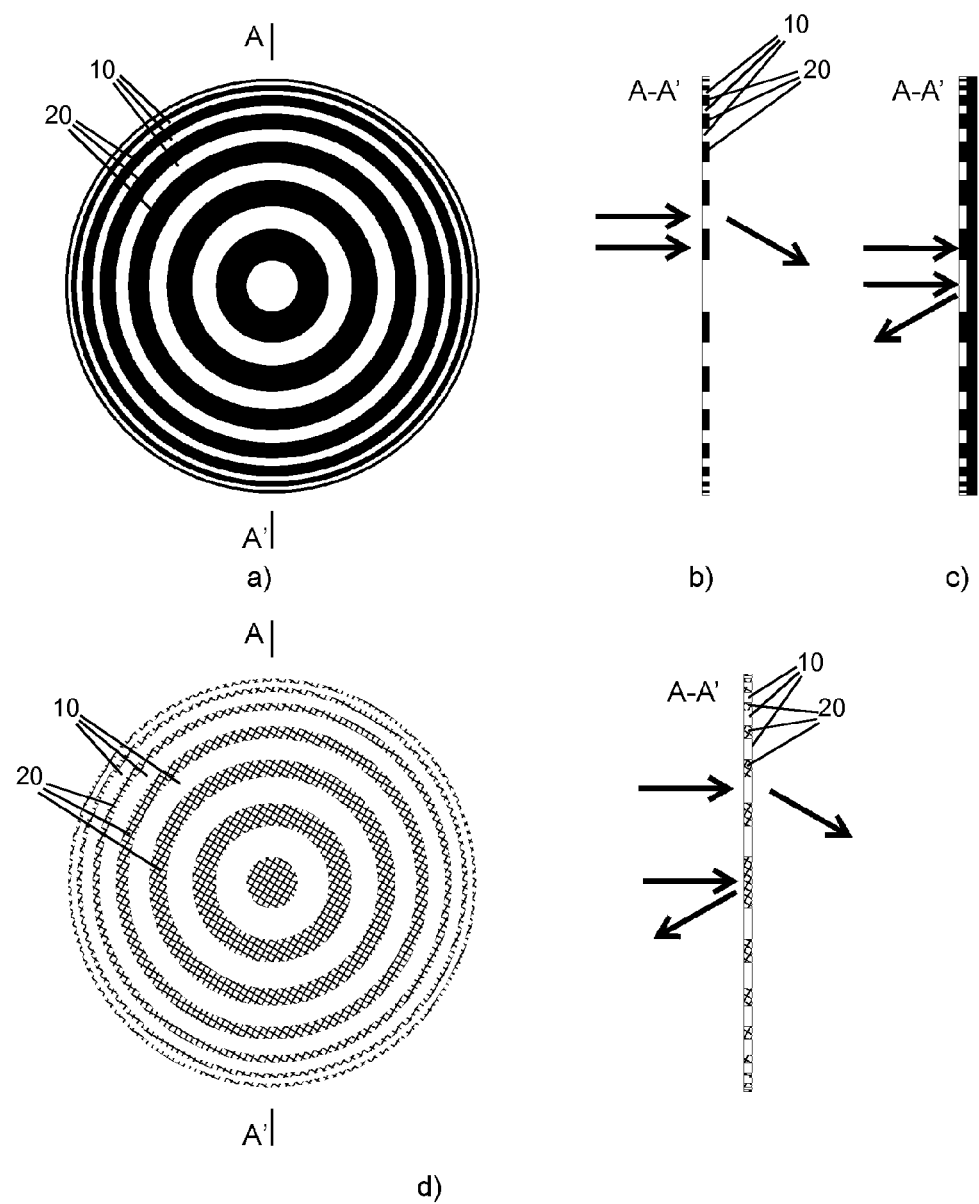
FIGS. 3(*a*) to (*d*), which have already been referred to, are schematic top or cross-sectional views of examples of diffractive lens optical elements formed by zones, showing (a) an amplitude zone construction of the optical element, (b) a transmission arrangement thereof, (c) a reflection arrangement thereof, and (d) a combined transmission and reflection arrangement thereof.
Figure 4:
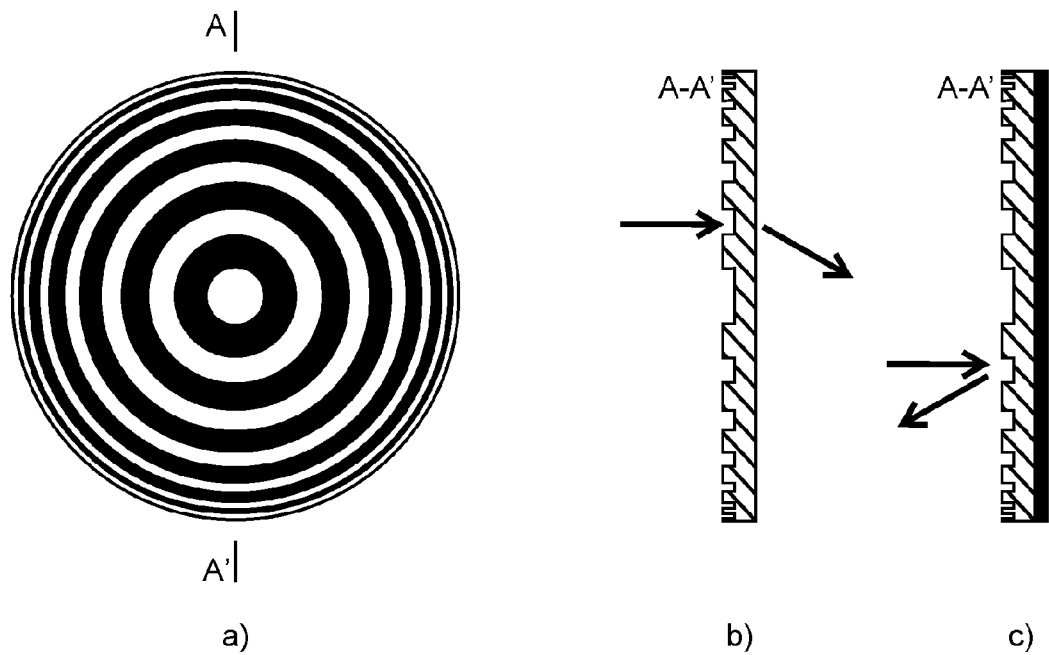
FIGS. 4(*a*) to (*c*), which have already been referred to, are schematic top or cross-sectional views of further examples of diffractive lens optical elements formed by zones, showing (a) a relief type of phase zone construction of the optical element, (b) a transmission arrangement thereof, and (c) a reflection arrangement thereof.
Figure 5:
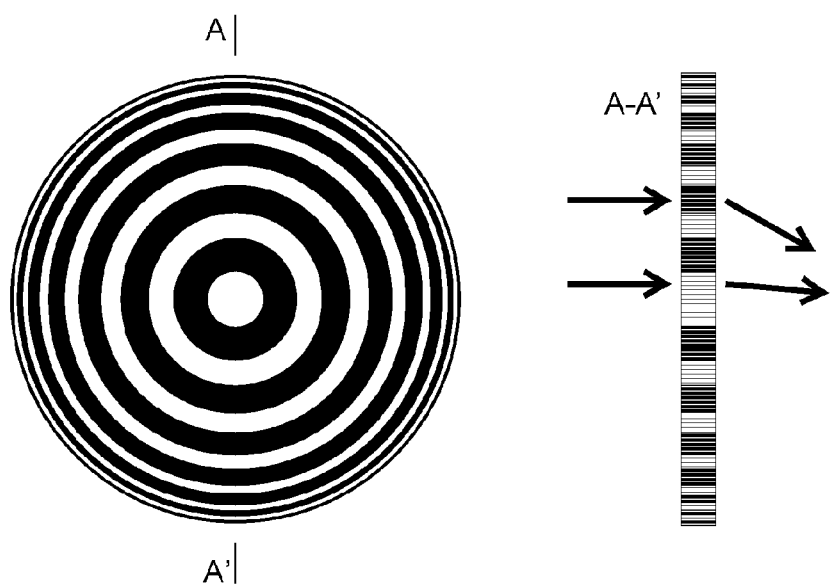
FIG. 5, which has already been referred to, is a schematic top and cross-sectional view of a further example of a diffractive lens optical element formed by zones, showing a refractive index zone modulation construction thereof.
Figure 6:
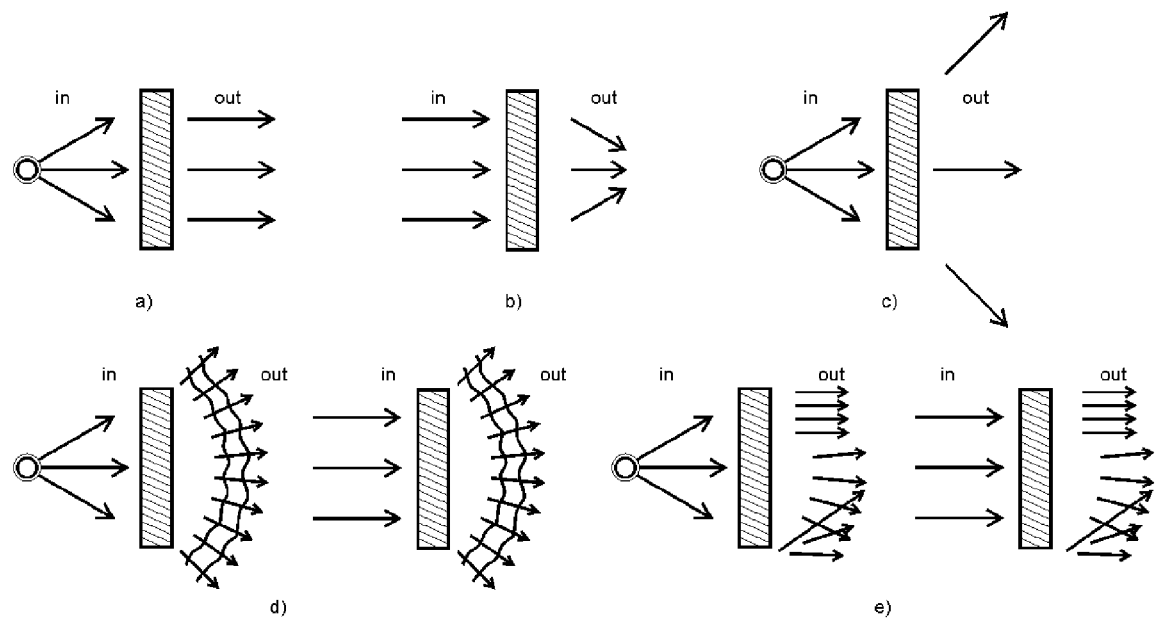
FIGS. 6(*a*) to (*e*), which have already been referred to, are schematic cross-sectional views illustrating various functions of optical elements, showing (a) collimation, (b) focusing, (c) divergence, (d) diffusion, and (e) general beam redistribution.
Figure 7:
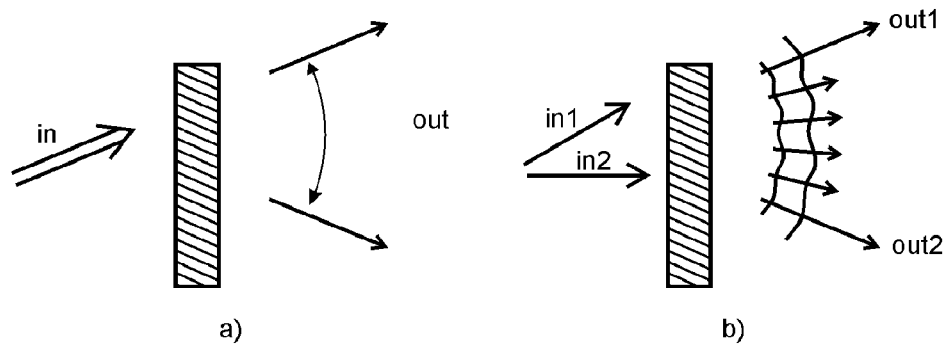
FIGS. 7(*a*) and (*b*), which have already been referred to, are schematic cross-sectional views illustrating examples of optical elements functions with implemented noise, showing (a) diffraction of an incoming beam into a fan of multiple directions at the lens output, and (b) two distinct beams at the lens input being blended at the lens output.
Figure 8:
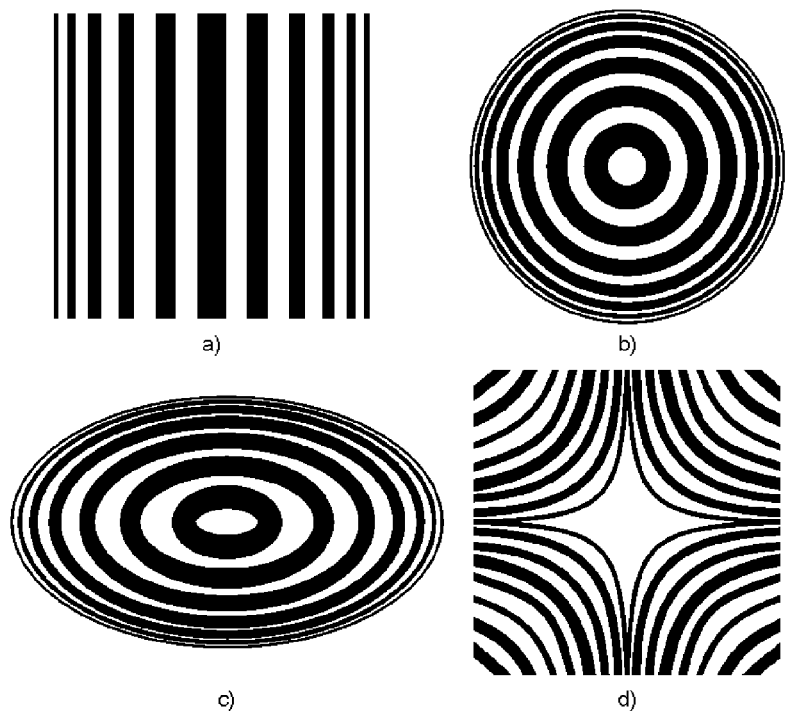
FIGS. 8(*a*) to (*d*) are schematic views of examples of zone distribution and shape of an optical element zonal structure, showing (a) linear, (b) circular, (c) elliptic, and (d) hyperbolic zones.

FIGS. 1 to 7 have already been referred to and described hereinabove. Referring therefore now to FIGS. 8 to 15:

Several examples of the shape and distribution of optical zones in various species of diffractive Fresnel lens-type optical elements are shown in FIG. 8. As illustrated there, such zonal structures may for example be (a) linear, (b) circular, (c) elliptic, or (d) hyperbolic. The zonal structure may for instance comprise any one of such arrangements substantially exclusively, or alternatively it may comprise a combination of two or more, or possibly even several, such different types of zonal structure.

Figure 9A:
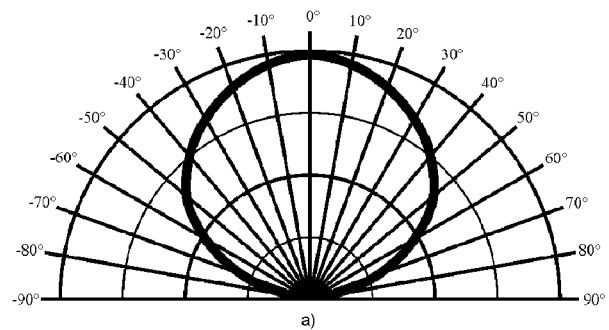
FIGS. 9(*a*) to (*d*) are schematic views of examples of irradiation characteristics of light before and after interaction with various zonal structures, showing (a) the irradiation characteristics of the light source itself, and (b), (c) and (d) the irradiation characteristics of the light after interaction with various zonal structures as respectively illustrated.

FIG. 9 shows several examples of modified irradiation characteristics of a light source, especially a source of visible and/or ultraviolet light, after its interaction with various particularly shaped and/or constructed zonal structures. As illustrated there: (a) shows the irradiation characteristics of the light source itself, i.e. the unmodified light beam, and (b), (c) and (d) each show the irradiation characteristics of the light after interaction with different respective zonal structures as respectively illustrated.

The basic zone structure may be of any general known type. For example it may comprise an amplitude type zonal structure, e.g. defined by varying, differing or contrasting amplitude, transmission, reflectance, absorbance, or a combination of any of the aforesaid, characteristics or optical properties, or it may comprise a phase type zonal structure, e.g. based on relief or modulation of refractive index or other optical properties (e.g. any of those just mentioned), or it may comprise a combination or combined form of any of the aforementioned types of zonal structures.

For use in the invention, the design of each zonal structure of the optical element, i.e. the zone shapes and/or the distribution of the zones, may be done for either (i) one wavelength of light, e.g. typically a substantially central wavelength within the spectral range of interest, or alternatively (ii) several wavelengths of light, e.g. typically three— usually red, green and blue—for visible wavelength ranges. A diffractive zonal structure, for example comprising selected zone widths and spacings and a selected zone profile, may usually be designed to operate in one diffraction order. However, zonal structures operating at higher and/or multiple diffraction orders may also be employed.

By way of example, typical dimensions of the zones, in terms of their widths, may for instance be from about 100 nanometres (nm) up to about 1 millimetre (mm). In many practical instances an upper limit on the range of zone width may be of the order of, or around, ~250 micrometres ($\mu m$).

In order to suppress or reduce the chromatic aberration of a zonal structure and/or to eventually smooth out the angular distribution of the outgoing light, any of the following exemplary novel homogenising noise implementations may be employed in accordance with embodiments of the invention:

(1) Zone Displacement

Figure 10:
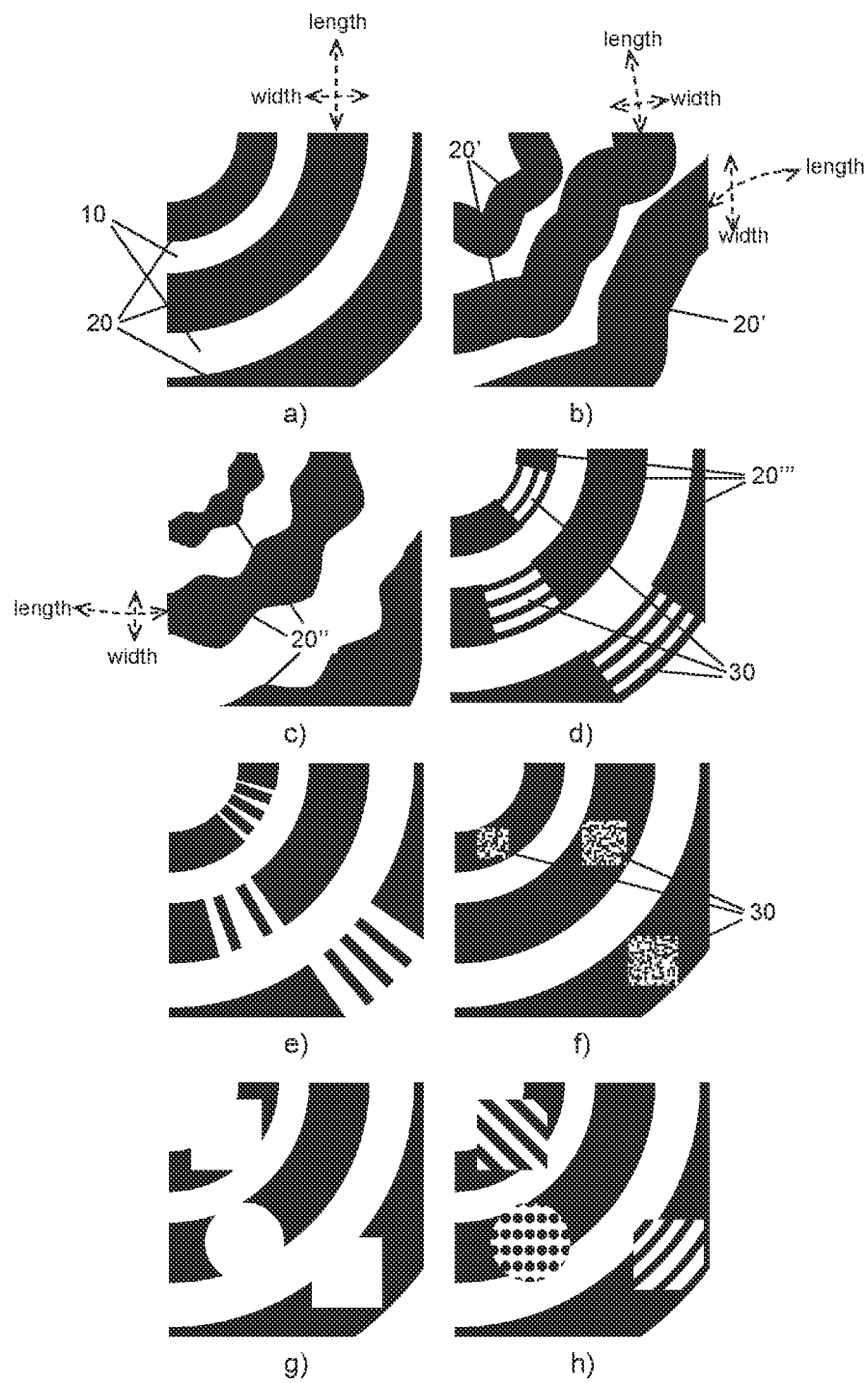
FIGS. 10(*a*) to (*h*) are schematic views of examples of displacement and/or modulation features of the optical element zonal structure in accordance with embodiments of the invention, showing (a) the original zonal arrangement, (b) zone displacement, (c) zone boundary displacement, (d) zone modulation along the zones, (e) zone modulation across the zones, (f) zone modulation with encoded information, (g) zone modulation by a pattern without any additional structure, and (h) zone modulation by a pattern with additional structure.

An original, unmodified and undisplaced shape of the zone, comprising alternating transmitting/reflecting and absorbing (i.e. substantially opaque) and/or relief type phase constructed and/or refractive index modulated zones 10, 20, respectively, is shown in FIG. 10(*a*). This zone shape is modified along its longitudinal length by adding deviations in the form of "ripples" into its shape. Ripples can be understood to mean local displacements of a zone, relative to the zone's original, unmodified position, configuration or orientation. Such ripples may for example take the form of overall zone displacement, where the body or central line or longitudinal axis of each zone 20' is distorted or convoluted or periodically changing (e.g. sinuous) in shape, as in FIG. 10(*b*). Alternatively, they may take the form of zone boundary displacement, where one or both edges or boundaries of each zone 20" is/are displaced or shifted in position relative to the body or central line or longitudinal axis of the zone 20" itself, as in FIG. 10(*c*).

Such ripples may be generated or applied randomly, quasi-randomly or deterministically, with various and/or varying degrees of modulation depth, i.e. ripple amplitude and/or ripple periodicity or wavelength.

By way of example, typical dimensions of the zonal displacement feature(s), i.e. a displacement distance or other displacement dimension relative to the undisplaced zone (or zone edge or boundary thereof), may not have any practical limit placed on it/them. Moreover the displacement feature(s), e.g. ripple(s), may if desired or appropriate be synchronised over all the zones subject to that/those displacement feature(s), that is to say all the ripples (or other displacement features) may all have substantially the same periodicity and amplitude. Furthermore the amplitude, periodicity, etc, of the ripple(s) or other displacement feature(s) may be of any size, value or scale, according to choice, suitability or applicability.

Figure 11:
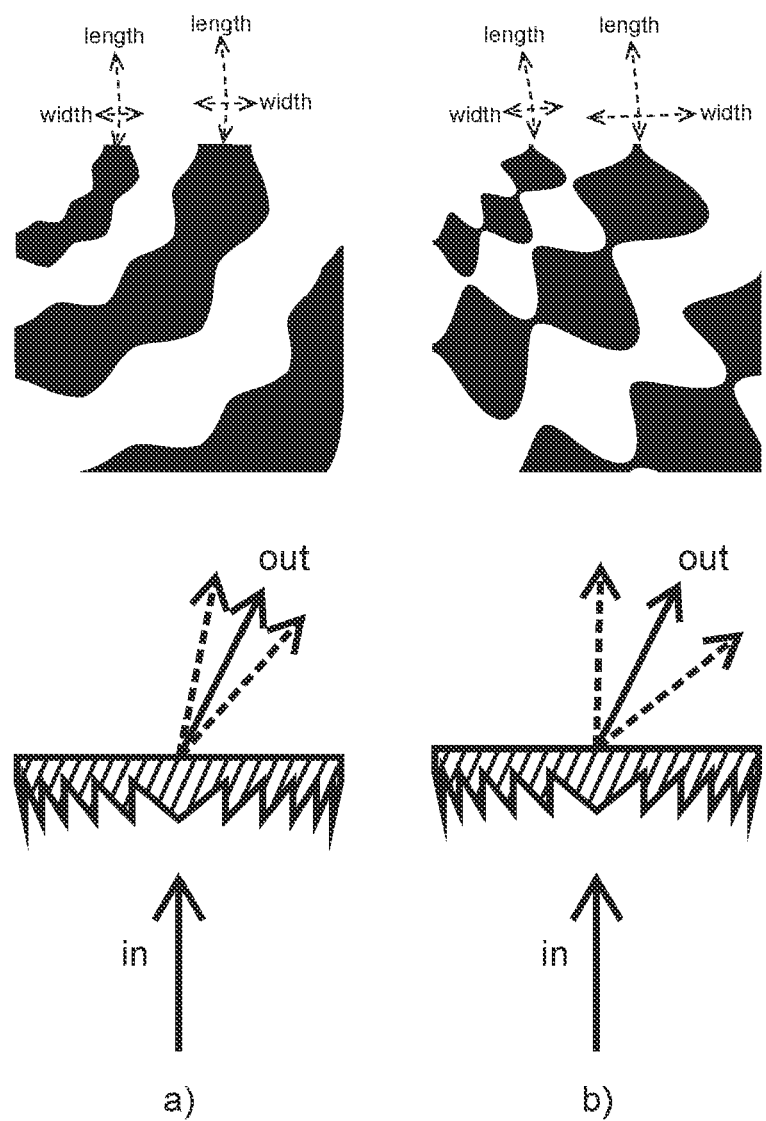
FIGS. 11(*a*) and (*b*) are schematic views of two examples of modified irradiation characteristics with differently modified zones having ripples introduced therein, in accordance with embodiments of the invention.

The ripples represent added homogenising noise to the zonal structure, which is responsible for added scatter of the outgoing light propagating primarily in the direction determined by the original zone distribution, as illustrated in FIG. 11, which shows two examples of modified irradiation characteristics with differently modified zones.

Figure 12:
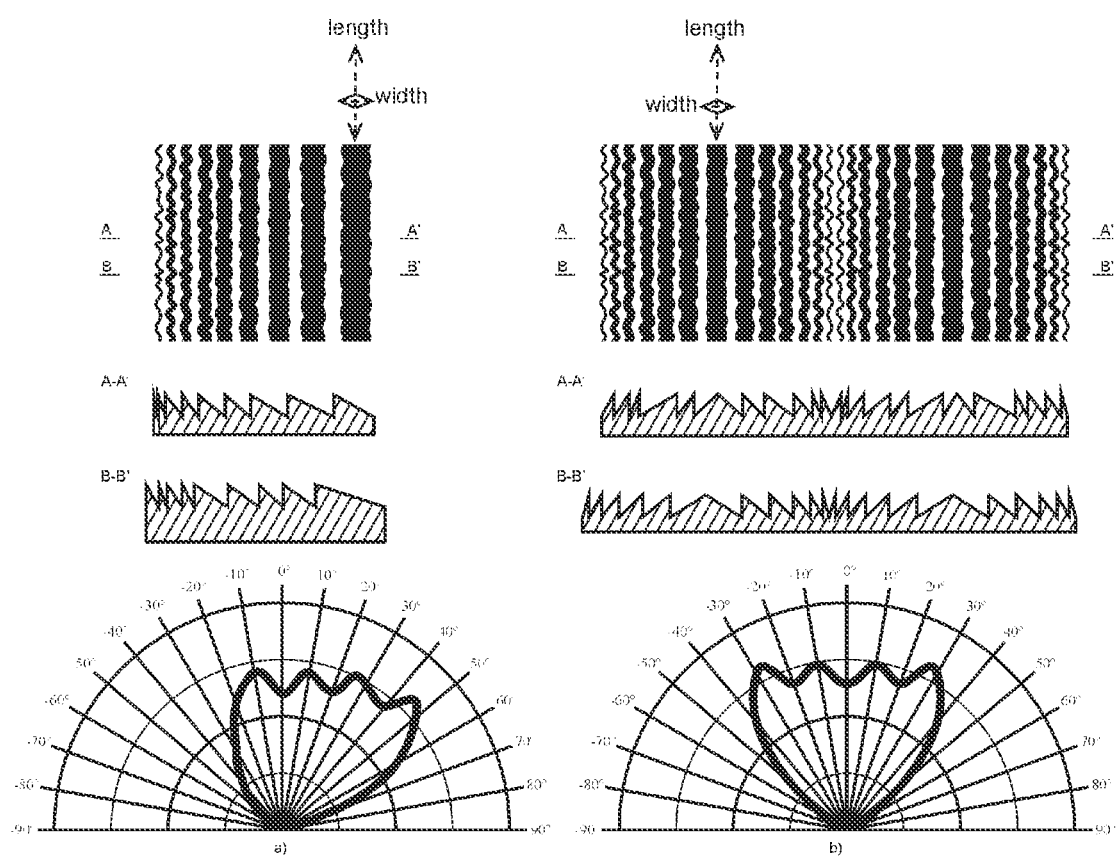
FIGS. 12(*a*) and (*b*) are schematic views of examples of irradiation characteristics of optical elements with ripples added to the zones, in accordance with embodiments of the invention, showing (a) an asymmetrical pattern, and (b) a symmetrical pattern.

Each zone may be modified using the same or a different displacement function. Furthermore, the function dictating the modification of any given zone may or may not change, e.g. change arbitrarily, along the respective zone's longitudinal length. Examples of modified irradiation characteristics with modified zones including ripples are shown in FIG. 12, where (a) shows an asymmetrical ripple pattern, and (b) shows a symmetrical ripple pattern. Thus, in embodiments such ripple patterns may be either asymmetrical or symmetrical.

It is to be understood that although the examples being described and illustrated here (above and below) are, for simplicity of understanding, described and illustrated in relation to an amplitude type of zonal optical element (based on transmitting and absorbing zones), analogous or corresponding examples may be usefully and practically applied to other types of zonal structures, such as phase type zonal optical elements—i.e. in which the zones are constructed as relief or as modulation of refractive index or other optical property(ies)—or even combined forms of amplitude and phase type zonal structures.

(2) Zone Modulation (or patterning)

Another way to add homogenising noise into a zonal structure is to modulate or introduce a pattern into it, e.g. to apply onto or into each of the respective zones 20''' a region, portion, site or patch 30 comprising or forming or bearing a pattern or patterned structure, body or form, either across at least a portion of its width or along at least a portion of its length, as shown by way of examples in FIGS. 10(*d*) to 10(*h*). Such patterned regions, portions, sites or patches 30 may for example take the form of a geometrical figure, pattern or design, a simple or complex design element or feature, or any form of artistic work. Such a modulation or pattern 30 may be randomly, quasi-randomly or deterministically distributed along the respective zone(s) with the purpose of adding scatter to the output light propagating primarily in the direction determined by the original zone distribution pattern.

Figure 13:
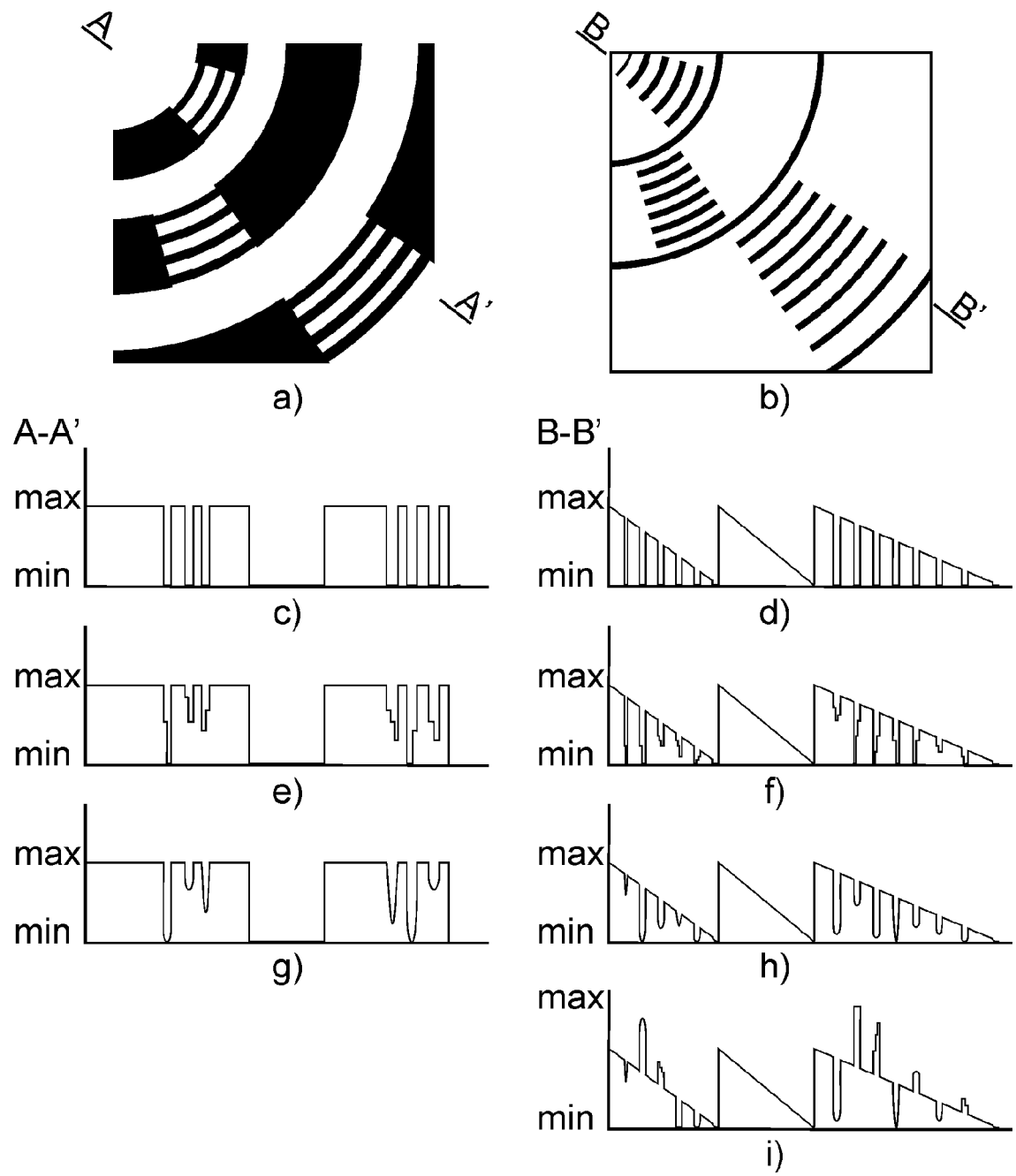
FIGS. 13(*a*) to (*i*) are schematic views of examples of various forms of modulation of optical properties of zones of a zonal optical element, in accordance with embodiments of the invention, showing (a) in plan view, modulation of zones with discrete (i.e. binary) zone property profiles, (b) in plan view, modulation of zones with continuous zone property profiles, (c) a discrete (i.e. binary) zone property modulation profile of the arrangement shown in case (a), (d) a discrete (i.e. binary) zone property modulation profile of the arrangement shown in case (b), (e) a stepped zone property modulation profile of the arrangement shown in case (a) (i.e. an approximation of a continuous zone property modulation or a combination of binary modulations with different depths of modulation), (f) a stepped zone property modulation profile of the arrangement shown in case (b), (g) a continuous zone property modulation profile of the arrangement shown in case (a), (h) a continuous zone property modulation profile of the arrangement shown in case (b), and (i) a general/combined modulation profile.

FIGS. 13(*a*) to (*i*) show examples of various forms of modulation of optical properties of zones of a zonal optical element, in accordance with embodiments of the invention. As shown there by way of illustrative example:

(a) shows, in plan view, modulation of optical element zones having discrete, i.e. binary, zone property profiles;

(b) shows, in plan view, modulation of optical element zones having substantially continuously variable zone property profiles;

(c) shows a discrete, i.e. binary, zone property modulation profile of the arrangement shown in case (a);

(d) shows a discrete, i.e. binary, zone property modulation profile of the arrangement shown in case (b);

(e) shows a stepped zone property modulation profile of the arrangement shown in case (a) (i.e. an approximation of a continuous zone property modulation or a combination of binary modulations with different depths of modulation);

(f) shows a stepped zone property modulation profile of the arrangement shown in case (b);

(g) shows a substantially continuous zone property modulation profile of the arrangement shown in case (a);

(h) shows a substantially continuous zone property modulation profile of the arrangement shown in case (b); and (i) shows a general/combined modulation profile, i.e. the binary and/or stepped and/or continuous modulation feature(s) may be combined, whereby the function does not necessarily have to be only decreased by the modulation feature(s)—it may also be increased by it/them.

Thus the property (or material) modulation of the zones does not have to be discrete, i.e. merely only binary (i.e. black and white), but it may instead—or even additionally—vary, e.g. vary continuously, smoothly or gradually, along the longitudinal length of, and/or across the width of, each chosen zone. The property (or material) modulation may also have variable modulation depth(s). In particular, the functions depicted in FIGS. 13(*c*) to (*i*) show zone modulation options in which the function may represent any of a variety of possible optical element zone optical property (or material) parameters, e.g. absorption, transmission, reflection, refractive index, zone relief height or zone relief depth, any or all of which may vary discretely or continuously across any particular zone profile.

By way of example, typical dimensions of the zonal modulation feature(s) may be as follows: it/their depth or height may for example be in the range of from about 0 up to about 20 micrometres (μm), preferably from about 0 up to about 2 micrometres (μm); it/their lateral dimensions may for example be in the range of from about 10 nanometres (nm) up to about 20 micrometres (μm), preferably from about 10 nm up to about 6 μm.

Figure 14:
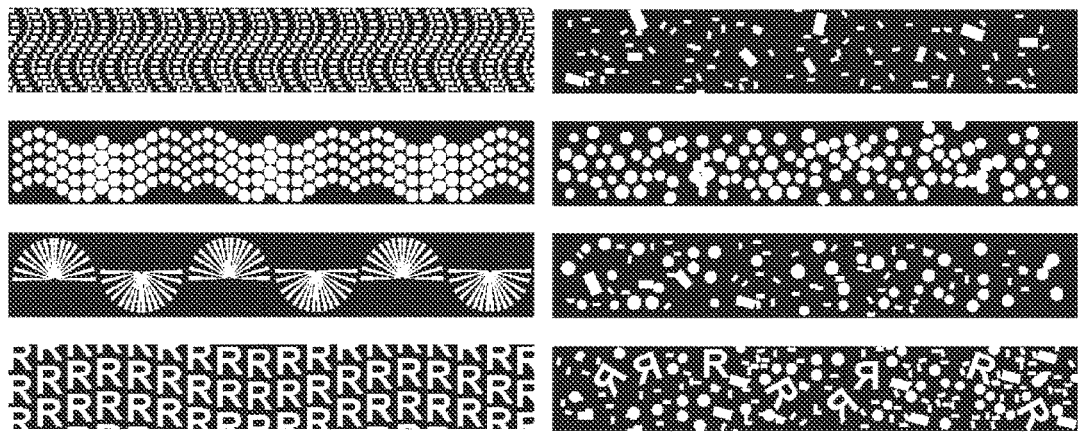
FIG. 14 shows schematic views of various examples of regular, quasi-regular and random noise patterns which can be used to modulate zones or their parts, in accordance with embodiments of the invention.

In embodiments of the invention in which the zone property (or material) modification takes the form of zone modulation or an applied pattern, the zone modulation or applied pattern may if desired carry one or more of encoded data, graphical image(s), alpha-numerical data, indicia or information, and/or one or more holographic features—as illustrated by way of examples in FIG. 14. Here there are shown various examples of regular, quasi-regular and random noise patterns, on top of its primary homogenising noise-introducing function.

This form of zone modulation may optionally be used as an optical element identifier, a visual design feature, or even as a security device or feature.

(3) Zone Displacement and Modulation (or Patterning) Combinations

Figure 15:
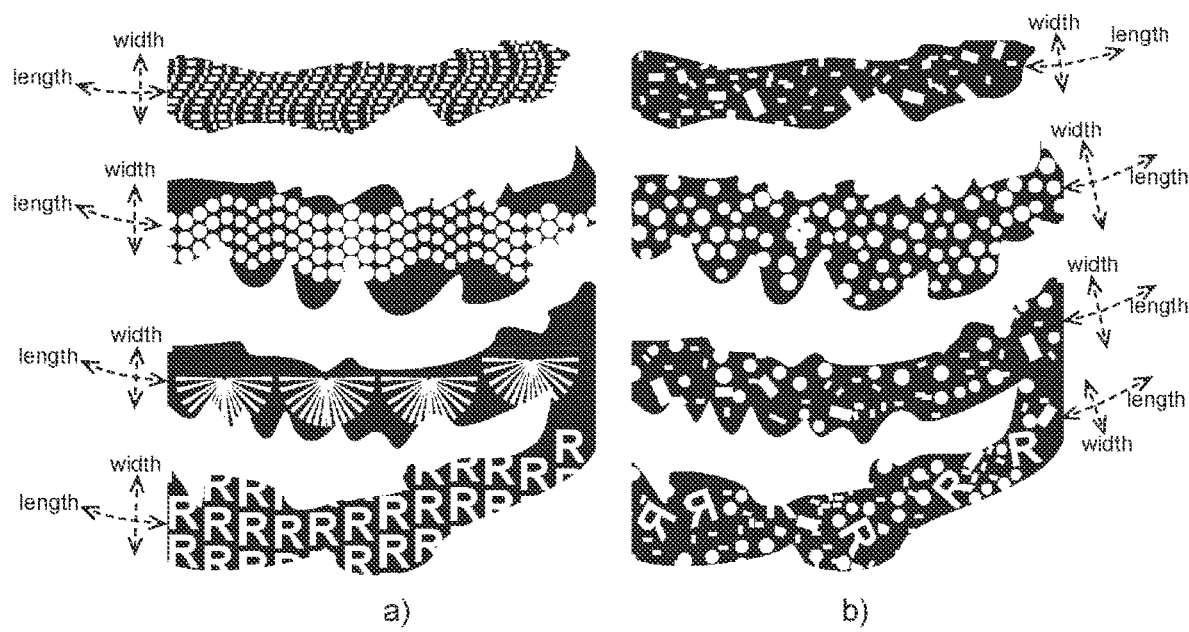
FIG. 15 shows schematic views of various examples of combinations of zone displacement and zone modulation (or patterning), in accordance with embodiments of the invention, showing (a) zone displacement combined with zone modulation, with regular and/or quasi-regular modification, and (b) zone displacement combined with zone modulation, with random modulation.

A combination of both of the above techniques (1) and (2) of noise addition may be used, as illustrated by way of example in FIG. 15, which shows (a) zone displacement combined with zone modulation, with regular and/or quasi-regular modification, and (b) zone displacement combined with zone modulation, with random modulation. Such a displacement and modulation or patterning may be randomly, quasi-randomly or deterministically distributed across and/or along the respective zone(s) with the purpose of adding scatter to the output light propagating primarily in the direction determined by the original zone distribution.

Such combinations may be useful in particular for facilitating production of optical elements having a particularly unique or special required combination of irradiation characteristics. Such combinations of these techniques could be employed for example if the necessary zonal optical element design were to be too complicated to be modified by one of the aforementioned techniques only. This means for example that the displacement technique could be used to maintain a particular chromaticity of the outgoing light, whereas the modulation technique could be used as a homogeniser. Thus each technique could be used to control only one respective function of the overall optical element.

Optical elements in accordance with embodiments of the invention may in general principle terms be made using known materials, apparatuses and manufacturing methods, as will be well understood and available to persons skilled in the art. Critical to the invention however is the introduction—into such generally known methods—of the characteristic zonal modification feature(s), especially zonal displacement and/or modulation (or patterning) feature(s), as defined and described by way of example hereinabove.

By way of example: The production of optical elements according to embodiments of the invention may be defined or described by the following sequential steps:

(A): Optical element specification→→

(B): Design process: Construction of optical element with original, non-displaced and/or non-modulated zones, e.g. a lens with focal length F and a collimating function→→(C1+D1) sequence or (C2+D2) sequence, as follows:

(C1): Zone displacement and/or modulation (preferably part of the design process)→→

(D1) Optical element forming, e.g. by a writing method/process (such as by means of an e-beam or laser writer) or some other forming method/process (such as holographic interference, selective coating, etching, etc) (i.e. preferably a single writing or other forming method).

or (C2): Optical element forming, e.g. by a writing method/process (such as by means of an e-beam or laser writer) or some other forming method/process (such as holographic interference, selective coating, etching, etc)→→

(D2) Additional structure forming, e.g. writing or other forming method (such as by any of the above-mentioned writing or other forming methods) (i.e. preferably a multiple writing or other forming method, e.g. diffractive Fresnel lens+noise).

In preferred examples of the above (C1) step: The zone displacement and/or zone modulation technique(s) preferably take place in this production step. The displacement or modulation may be random, e.g. each zone is locally displaced or modified according to its original position or profile. An alternative manner of zone displacement or modulation can be to use a quasi-random modification, e.g. to decrease the displacement or modulation impact and/or density and/or appearance with increasing distance from the centre of the optical element. In this manner the quasi-random modification means that the displacement and/or modulation may be partially or particularly controlled. The zone displacement and/or modulation may instead be substantially fully controlled, i.e. the displacement and/or modulation functions may in this case not be based on or rely on any random input or output.

In preferred examples of the above (C2) step: Suitable examples of preferred writing methods for the optical element production may include any of the following: photolithography, e-beam lithography, laser lithography, holography, focused ion beam techniques or any of various direct writing options of the aforementioned methods, e.g. direct laser writing, etc.

For the manufacture of optical elements in accordance with the invention, the following exemplary materials may be used:
  (i) Absorbing and transmitting (or reflecting) zones: photo-sensitive materials, e.g. halogen-silver photomaterials;
  (ii) Reflection materials: mostly metals, e.g. any of gold (Au), silver (Ag), chromium (Cr), nickel (Ni), copper (Cu), tin (Sn), aluminium (Al), and possibly some alloys, e.g. brass; partially reflecting and transmitting materials, e.g. $TiO_2$, ZnS (i.e. typically high refractive index oxides or sulfides);
  (iii) Transmission materials: (a) low refractive index materials: mostly plastics materials, e.g. polyethylene (PE), polypropylene (PP), polyvinyl chloride (PVC), polyethyleneterephthalate (PET), polymethylmethacrylate (PMMA), polycarbonate (PC), UV lacquers, glasses, copolymers; (b) high refractive index materials: mostly metal oxides or sulphides, e.g. titanium dioxide ($TiO_2$), zinc sulphide (ZnS), etc;
  (iv) Refractive index modulation materials: e.g. photopolymers, dichromated gelatine (DCG).

For the manufacture of optical elements in accordance with the invention, the following exemplary procedures may be used:
  (i) First of all, the optical element original zones are calculated following the given irradiation characteristics and properties of the required light source.
  (ii) The position and width of each zone (i.e. the so-called PW function) is calculated with respect to a chosen representative wavelength (e.g. 580 nm, around the middle of the visible spectrum). It is usually represented by a matrix where each point corresponds to a position of a certain zone.
  (iii) Then the noise function is applied:
    (a) It could be a random number from a specific interval generated for each position to modify locally the zone width and/or position. The noise function is usually added to the original PW function, but multiplication or e.g. convolution can also be applied to combine these two functions. The noise function can be generated regardless of the PW function or the specific interval can narrow with increasing distance from the centre of the optical element, etc.
    (b) A function that generates randomly distributed objects, e.g. squares, rectangles, circles, stars, etc, is used to modify the original zone distribution, e.g. by means of a binary matrix—objects are white, background is black. The original zone distribution matrix is selectively overlapped by the noise matrix, i.e. all objects of the noise matrix are pasted into the original matrix, whereas the background does not affect the original matrix at all.
    (c) The original zone distribution matrix can be calculated as a profile of all zones, i.e. each pixel represents the depth of the structure at that actual position. Then the noise function addition can be used to modify/modulate each zone profile.

The above exemplary procedures under (i), (ii) and (iii) (a)-(c) may be performed using any suitable known techniques, procedures, apparatus, algorithms and/or software, as will be well understood and readily available to persons skilled in the art.

In particular, any suitable known software package that enables the creation of one's own functions, procedures, macros, etc may be used, as is widely practised in the art hitherto. The manner of design, calculation and application of the noise function are likewise well-known to persons skilled in the art, although the calculations themselves may be introduced in accordance with the novel features of the invention. Operating noise is also known from some other branches of technology, e.g. in digital image processing. However, in the present case the noise may be rather operated in an opposite manner, i.e. in order to minimise its impact on or rate in the image to be produced. The noise functions calculations may be adjusted with respect to the principles of diffraction or refraction, but the impact of the noise may be technically the same as e.g. in the digital image.

Figure 16:
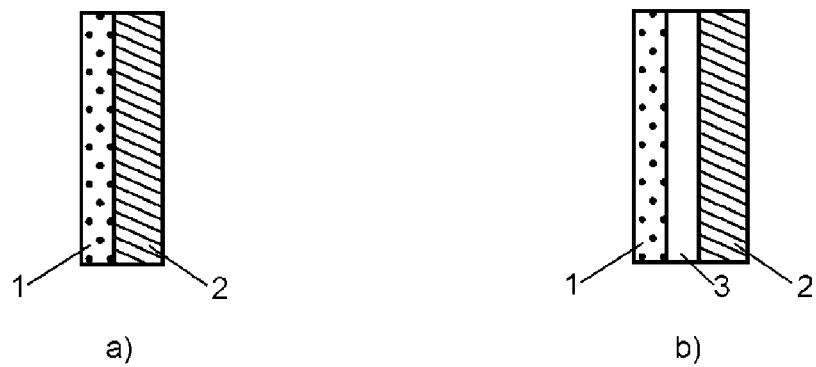
FIGS. 16(*a*) and (*b*) are schematic cross-sectional views of two further embodiments of optical element in accordance with the invention, which employ an auxiliary diffuser or homogenising element, and/or a carrier layer, in combination with the main optical structure element.

Turning to FIGS. 16(a) and 16(b), here there are shown schematically in cross-section two further embodiments of optical element in accordance with the invention, which employ an auxiliary diffuser or homogenising element, and/or a carrier layer, in combination with the main or underlying optical structure element which includes the characteristic noise-introducing feature(s) such as any of those features or structures discussed hereinabove.

As shown in FIG. 16(a), the main or underlying optical structure element 2 of the optical element may be mounted or positioned on a diffuser or other homogenising structure or element 1 (which may simply be termed a "diffuser/homogeniser" for simplicity). The diffuser/homogeniser 1 may optionally serve as a carrier for the main underlying optical structure element 2. The placement or mounting of the main optical structure element 2 on the diffuser/homogeniser 1 may be accomplished for example by direct pressing of the former into the material from which the diffuser/homogeniser 1 is formed (or vice versa), or by any suitable adhesion, lamination or other attachment technique between the two components. Alternatively the main optical structure element 2 and the diffuser/homogeniser 1 may be united by a unitary- or direct-moulding technique, e.g. by direct moulding-in of one component into or onto the other.

In an alternative arrangement, as shown in FIG. 16(b), the main optical structure element 2 may instead be mounted or positioned on the diffuser/homogeniser 1 via a discrete carrier layer 3 sandwiched in between them. In a further alternative arrangement, instead of the carrier layer 3 being disposed between the main optical structure element 2 and the diffuser/homogeniser 1, the main optical structure element 2 may instead be secured to the diffuser/homogeniser 1 and only the latter attached to the carrier layer 3. In this manner any discrete carrier or carrier layer 3 may be a material layer which in effect carries all of the optical components (diffuser/homogeniser 1, main optical structure element 2, optionally any discrete optically active layer(s) forming a component of either of the preceding components) or is a material to which all the foregoing components are attached.

The diffuser/homogeniser 1 may be any suitable auxiliary optically functional structure or component serving a diffusing or homogenising purpose. For example, it may comprise an optical diffuser or homogenising element in the form of a diffuser plate or other type of element with a diffusing or homogenising function.

The arrangement of the main optical structure element 2 in combination with the diffuser/homogeniser 1 and (optionally) with the carrier 3 may for example be a transmission and/or a reflection type optical arrangement.

Figure 17:
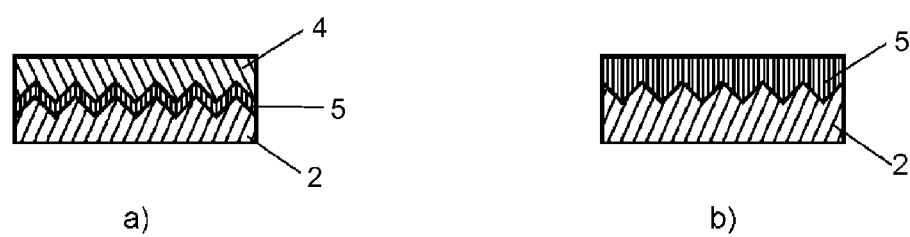
FIGS. 17(*a*) and (*b*) are schematic cross-sectional views of two yet further embodiments of optical element in accordance with the invention, which employ one or more cover layers.

FIGS. 17(a) and 17(b) are schematic cross-sectional views of two yet further embodiments of optical element in accordance with the invention, which employ one or more cover layers, e.g. of a plastics-based material, in combination with the main optical structure element 2. The, or at least one of the, cover layer(s) may be an outer protective layer 4, as shown in FIG. 17(a). Alternatively or additionally, as shown in FIG. 17(b), the, or at least one of the, cover layer(s) may be an optically active layer 5 providing one or more additional optical functions which may be desirable in the final complete optical element.

For example, an optically active cover layer 5 may be a HRI or LRI material diffuser, a diffusion material or other homogenising material, which changes the direction of light propagation and the distribution of its intensity. An optically active layer 5 may even for instance comprise a copied relief optical element, as shown schematically in both FIGS. 17(a) and (b). Moreover, the overall optical element may have one or more optically active cover layers on one or both of its major sides. The cover layer(s) preferably at least protect(s) the main optical structure element 2 itself, although they may additionally serve an optical function by virtue of being of optically active material or formed with an inherent optically active structure.

Again, the arrangement of the main optical structure element 2 in combination with the protective cover layer 4 and/or the optically active layer 5 may for example be a transmission and/or a reflection type optical arrangement.

FIGS. 18(a), (b), (c) and (d) are schematic cross-sectional views of various embodiment optical systems within the scope of the invention, which may employ optical elements per se according to any embodiments of optical elements defined or described hereinabove. Such optical systems may comprise any number of (e.g. one or a plurality of) such optical elements in combination with one or more, even a plurality of, light sources.

Such optical systems may be used for redistributing light from the source(s), which may for example be one or more LED's, e.g. white LED's or monochromatic LED's, LD's (laser diodes), or even conventional light bulbs or other known light sources. The arrangement of the optical element(s) and the light source(s) may for example be of a transmission and/or reflection type.

Various spatial or configurational arrangements of the or each optical element relative to the or each light source may be possible. For instance, the light source may be located on (or coincident with) the optical axis of the optical element, as shown schematically in FIG. 18(a). Alternatively the light source may be located outside (i.e. non-coincident with) the optical axis of the optical element, as shown schematically in FIG. 18(b). Also as shown schematically in FIG. 18(b), the light source may be oriented parallel to the axis of the optical element, or it may be oriented angled or tilted relative thereto, as shown schematically in FIG. 18(c). (Alternatively, such an angled or tilted light source may of course be located instead on or coincident with the optical axis of the optical element, as shown in principle in FIG. 18(a).) Furthermore, as illustrated schematically in FIG. 18(d), the light source may even be placed within a material of the same or a different refractive index as/from that in which is defined or measured the radiation pattern of the optical element itself, e.g. the light source may even be placed in a plastics material and the radiation pattern of the optical element defined in air, as shown schematically in FIG. 18(d).

Figure 18:
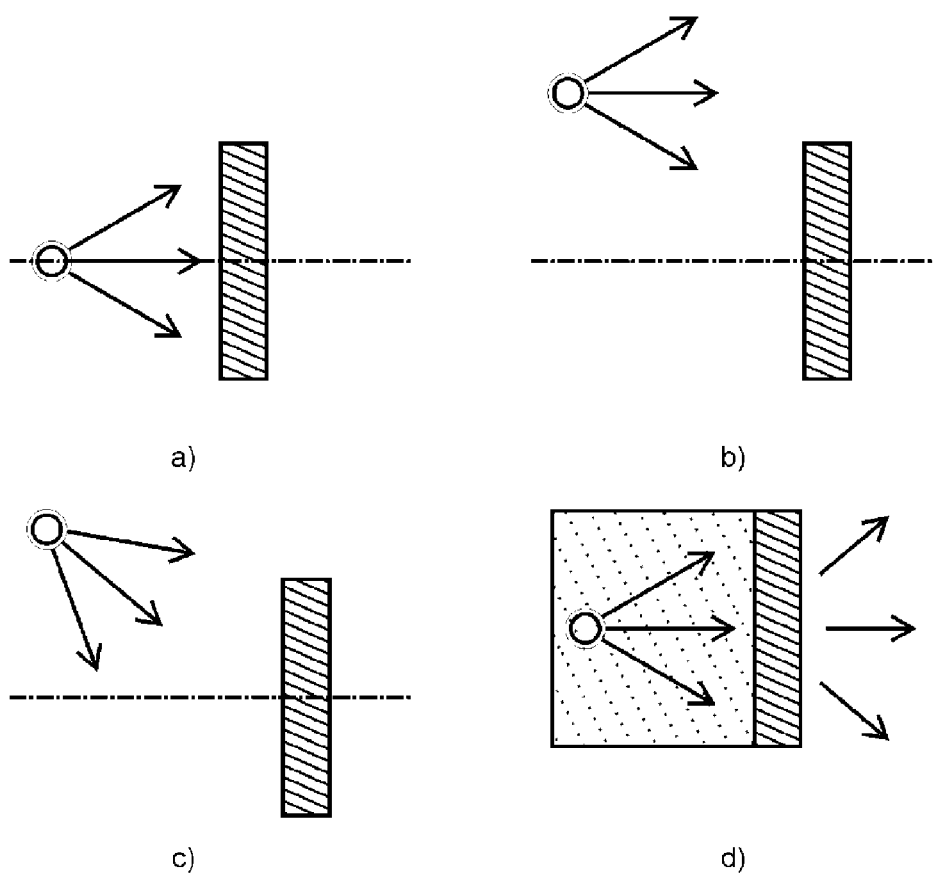
FIGS. 18(*a*), (*b*), (*c*) and (*d*) are schematic cross-sectional views of various embodiment optical systems within the scope of the invention, which may employ optical elements according to various embodiments.

In other example arrangements following on from FIG. 18, such optical systems may even comprise a plurality of optical elements, at least one of which may have a function of e.g. a collimator or reflector which directs light generally as required, and at least one other of which may function to ensure a final distribution of the light as required.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An optical element having a zonal structure comprising a plurality of diffractive and/or refractive optical zones, each optical zone being defined by a region of the optical element having one or more different optical properties from regions outside that zone, said optical properties being selected from optical reflectivity, optical absorptivity, refractive index, and diffractive and/or refractive optical relief height or depth, and each said optical zone having a length and extending in a lengthwise direction thereof and having edges or boundaries defining therebetween a transverse width thereof, wherein at least one or more of the zones comprises, within the or a respective zone, one or more noise-introducing zonal displacement features constituted by the or the respective zone independently having one or both of its edges or boundaries being rippled in shape passing along the zone in said lengthwise direction thereof, the ripples in the said one or both edges or boundaries each having a wavelength and also an amplitude relative to a lengthwise-extending center line of the or the respective zone, wherein the said ripples constituting the or the respective said noise-introducing zonal displacement rippled feature act as a chromatic homogenising noise-introducing zonal displacement rippled feature, and wherein:

(i) the said amplitude and/or wavelength of each of the said ripples varies passing along the or the respective zone in the said lengthwise direction thereof; and (ii) a displacement function which defines the configuration, relative to the or the respective undisplaced zone, of either or both edges or boundaries of the or the respective rippled zone either:
  a) varies passing along at least a portion of the length, in the said lengthwise direction, of the or the respective zone, or
  b) varies passing along substantially the whole length, in the said lengthwise direction, of the or the respective zone; and (iii) the ripples are arranged randomly, quasi-randomly or deterministically along the said lengthwise direction of the or the respective zone.

2. An optical element according to claim 1, wherein at least one said noise-introducing zonal displacement rippled feature is provided within at least one of said optical zones.

3. An optical element according to claim 1, wherein at least one said noise-introducing zonal displacement rippled feature is provided within each of a plurality of said optical zones.

4. An optical element according to claim 1, wherein the said at least one or more zones comprises, within the or the respective zone, one or more said noise-introducing zonal displacement rippled features, and wherein the or the respective said zone is rippled in the general plane of the optical element.

5. An optical element according to claim 1, wherein each said optical zone extends in a respective lengthwise direction thereof which lies generally centrally of the respective zone passing along its respective length, and wherein each said zone comprises, within the or the respective zone, the said one or more noise-introducing zonal displacement rippled features, and an orientation of each respective said central lengthwise direction of each respective said zone varies passing along it in its respective said lengthwise direction.

6. An optical element according to claim 1, wherein the said at least one or more zones comprises, within the or the respective zone, one or more said noise-introducing zonal displacement rippled features, and the configurations of the edges or boundaries of the or the respective rippled zone are the same or different or opposite or complementary to each other.

7. An optical element according to claim 1, wherein the said at least one or more zones comprises, within the or the respective zone, the said one or more noise-introducing zonal displacement rippled features, and the said displacement function which defines said edge or boundary of the or the respective rippled zone varies either (i) suddenly or binarily, or (ii) gradually or substantially continuously in defining said edge or boundary of the or the respective rippled zone.

8. An optical element according to claim 7, wherein the said varying displacement function which defines the said edge or boundary of the or the respective rippled zone is selected from displacement functions which define the said edge or boundary in terms of variation in the said one or more optical properties of the respective rippled zone consisting of any of the following properties thereof:

optical reflectivity of the material of the respective rippled zone, optical absorptivity of the material of the respective rippled zone, refractive index of the material of the respective rippled zone, diffractive and/or refractive relief height of the respective rippled zone, diffractive and/or refractive relief depth of the respective rippled zone.

9. An optical element according to claim 1, wherein the optical element comprises a diffractive Fresnel lens.

10. An optical element according to claim 1, further comprising at least one auxiliary functional element, wherein the auxiliary functional element is selected from the group consisting of: an optical diffuser, an homogenising element, and at least one carrier.

11. An optical element according to claim 1, further comprising, or being provided with, one or more cover layers.

12. A method of forming an optical element having a zonal structure comprising a plurality of diffractive and/or refractive optical zones, each optical zone being defined by a region of the optical element having one or more different optical properties from regions outside that zone, said optical properties being selected from optical reflectivity, optical absorptivity, refractive index, and diffractive and/or refractive optical relief height or depth, and each said optical zone having a length and extending in a lengthwise direction thereof and having edges or boundaries defining therebetween a transverse width thereof, the method comprising:

forming said optical zones so as to include, within at least one or more of said zones, one or more noise-introducing zonal displacement features constituted by the or the respective zone independently being formed with one or both of its edges or boundaries rippled in shape passing along the zone in said lengthwise direction thereof, the ripples in the said one or both edges or boundaries each having a wavelength and also an amplitude relative to a lengthwise-extending center line of the or the respective zone, wherein the said ripples constituting the or the respective said noise-introducing zonal displacement rippled feature act as a chromatic homogenising noise-introducing zonal displacement rippled feature, and wherein:

(i) the said amplitude and/or wavelength of each of the said ripples varies passing along the or the respective zone in the said lengthwise direction thereof; and (ii) a displacement function which defines the configuration, relative to the or the respective undisplaced zone, of either or both edges or boundaries of the or the respective rippled zone either:
  a) varies passing along at least a portion of the length, in the said lengthwise direction, of the or the respective zone, or
  b) varies passing along substantially the whole length, in the said lengthwise direction, of the or the respective zone; and (iii) the ripples are arranged randomly, quasi-randomly or deterministically along the said lengthwise direction of the or the respective zone.

13. A method according to claim 12, wherein the method comprises the following sequential steps:
(A): Optical element specification, followed by
(B): Design process: Construction of optical element with original, non-displaced and/or non-modulated zones, followed by
(C1+D1) sequence or (C2+D2) sequence, as follows:
(C1): Zone displacement being part of the design process, followed by
(D1) Optical element forming,
whereby the final optical element is formed by a single element-forming method; or
(C2): Optical element forming, followed by
(D2) Additional structure forming,
whereby the final optical element is formed by a plural-stage element-forming method.

14. A method of homogenising light passing through and/or reflected from an optical element having a zonal structure comprising a plurality of diffractive and/or refractive optical zones, each optical zone being defined by a region of the optical element having one or more different optical properties from regions outside that zone, said optical properties being selected from optical reflectivity, optical absorptivity, refractive index, and diffractive and/or refractive optical relief height or depth, and each said optical zone having a length and extending in a lengthwise direction thereof and having edges or boundaries defining therebetween a transverse width thereof, the method comprising:
(A) forming said optical zones of the optical element so as to include, within at least one or more of said zones, one or more chromatic homogenising noise-introducing zonal displacement features constituted by the or the respective zone independently being formed with one or both of its edges or boundaries rippled in shape passing along the zone in said lengthwise direction thereof, the ripples in the said one or both edges or boundaries each having a wavelength and also an amplitude relative to a lengthwise extending center line of the or the respective zone, wherein the said ripples constituting the or the respective said noise-introducing zonal displacement rippled feature act as a chromatic homogenising noise-introducing zonal displacement rippled feature, and wherein:
  (i) the said amplitude and/or wavelength of each of the said ripples varies passing along the or the respective zone in the said lengthwise direction thereof; and
  (ii) a displacement function which defines the configuration, relative to the or the respective undisplaced zone, of either or both edges or boundaries of the or the respective rippled zone either:
    a) varies passing along at least a portion of the length, in the said lengthwise direction, of the or the respective zone, or
    b) varies passing along substantially the whole length, in the said lengthwise direction, of the or the respective zone; and
  (iii) the ripples are arranged randomly, quasi-randomly or deterministically along the said lengthwise direction of the or the respective zone; and
(B) passing the said light through and/or reflecting the said light from the said optical element.

15. A method of suppressing or reducing chromatic aberration in the passage of non-monochromatic light through and/or reflected from an optical element having a zonal structure comprising a plurality of diffractive and/or refractive optical zones, each optical zone being defined by a region of the optical element having one or more different optical properties from regions outside that zone, said optical properties being selected from optical reflectivity, optical absorptivity, refractive index, and diffractive and/or refractive optical relief height or depth, and each said optical zone having a length and extending in a lengthwise direction thereof and having edges or boundaries defining therebetween a transverse width thereof, the method comprising:
(A) forming said optical zones of the optical element so as to include, within at least one or more of said zones, one or more chromatic homogenising noise-introducing zonal displacement features constituted by the or the respective zone independently being formed with one or both of its edges or boundaries rippled in shape passing along the zone in said lengthwise direction thereof, the ripples in the said one or both edges or boundaries each having a wavelength and also an amplitude relative to a lengthwise-extending center line of the or the respective zone, wherein the said ripples constituting the or the respective said noise-introducing zonal displacement rippled feature act as a chromatic homogenising noise-introducing zonal displacement rippled feature, and wherein:
  (i) the said amplitude and/or wavelength of each of the said ripples varies passing along the or the respective zone in the said lengthwise direction thereof; and
  (ii) a displacement function which defines the configuration, relative to the or the respective undisplaced zone, of either or both edges or boundaries of the or the respective rippled zone either:
    a) varies passing along at least a portion of the length, in the said lengthwise direction, of the or the respective zone, or
    b) varies passing along substantially the whole length, in the said lengthwise direction, of the or the respective zone; and
  (iii) the ripples are arranged randomly, quasi-randomly or deterministically along the said lengthwise direction of the or the respective zone; and
(B) passing the said non-monochromatic light through and/or reflecting the said non-monochromatic light from the said optical element.

16. A method of modifying the angular and/or intensity characteristics of light passing through and/or reflected from an optical element having a zonal structure comprising a plurality of diffractive and/or refractive optical zones, each optical zone being defined by a region of the optical element having one or more different optical properties from regions outside that zone, said optical properties being selected from optical reflectivity, optical absorptivity, refractive index, and diffractive and/or refractive optical relief height or depth, and each said optical zone extending longitudinally in a length direction thereof and having edges or boundaries defining therebetween a width thereof, the method comprising:
(A) forming said optical zones of the optical element so as to include, within at least one or more of said zones, one or more chromatic homogenising noise-introducing zonal displacement features constituted by the or the respective zone independently being formed with one or both of its edges or boundaries rippled in shape passing along the zone in said length direction thereof, the ripples in the said one or both edges or boundaries each having a wavelength and also an amplitude relative to a longitudinally extending center line of the or the respective zone, wherein the said ripples constituting the or the respective said noise-introducing zonal displacement rippled feature act as a chromatic homogenising noise-introducing zonal displacement rippled feature, and wherein:
(i) the said amplitude and/or wavelength of each of the said ripples varies passing along the said length direction of the or the respective zone; and
(ii) a displacement function which defines the configuration, relative to the or the respective undisplaced zone, of either or both edges or boundaries of the or the respective rippled zone either:
   a) varies along at least a portion of the length, in the said length direction, of the or the respective zone, or
   b) varies along substantially the whole length, in the said length direction, of the or the respective zone; and
(iii) the ripples are arranged randomly, quasi-randomly or deterministically along the said lengthwise direction of the or the respective zone; and
(B) passing the said light through and/or reflecting the said light from the said optical element.

\* \* \* \* \*